United States Patent
Wood et al.

(10) Patent No.: US 10,654,985 B2
(45) Date of Patent: May 19, 2020

(54) MICROPOROUS POLYMERIC COMPOSITION

(71) Applicant: COMMONWEALTH SCIENTIFIC AND INDUSTRIAL RESEARCH ORGANISATION, Acton, ACT (AU)

(72) Inventors: Colin David Wood, Willetton (AU); Xavier Mulet, Victoria (AU); Cher Hon Lau, Victoria (AU); Matthew Roland Hill, Victoria (AU)

(73) Assignee: COMMONWEALTH SCIENTIFIC AND INDUSTRIAL RESEARCH ORGANISATION, Acton, ACT (AU)

( * ) Notice: Subject to any disclaimer, the term of this patent is extended or adjusted under 35 U.S.C. 154(b) by 102 days.

(21) Appl. No.: 15/571,431

(22) PCT Filed: May 26, 2016

(86) PCT No.: PCT/AU2016/050411
§ 371 (c)(1),
(2) Date: Nov. 2, 2017

(87) PCT Pub. No.: WO2016/187670
PCT Pub. Date: Dec. 1, 2016

(65) Prior Publication Data
US 2018/0142075 A1    May 24, 2018

(30) Foreign Application Priority Data
May 26, 2015    (AU) .................... 2015901934

(51) Int. Cl.
*B01D 71/00* (2006.01)
*C08J 9/28* (2006.01)
(Continued)

(52) U.S. Cl.
CPC .............. *C08J 9/28* (2013.01); *B01D 53/228* (2013.01); *B01D 61/362* (2013.01);
(Continued)

(58) Field of Classification Search
CPC ... C08J 9/28; C08J 9/0061; C08J 5/18; B01D 71/24; B01D 67/0016; B01D 53/228;
(Continued)

(56) References Cited

U.S. PATENT DOCUMENTS 9,815,032 B2 * 11/2017 Hill ...................... B01D 71/44
2009/0031898 A1    2/2009 Lin et al.
(Continued)

FOREIGN PATENT DOCUMENTS

WO    2010/002404 A1    1/2010
WO    2014/078914 A1    5/2014

OTHER PUBLICATIONS

Peter M. Budd, et al., "Free volume and intrinsic microporosity in polymers", Journal Materials Chemistry, Royal Society of Chemistry, GB, vol. 15, Feb. 8, 2005, p. 1977-1986, XP-002413372.
(Continued)

Primary Examiner — Taiwo Oladapo
(74) Attorney, Agent, or Firm — Ladas & Parry LLP

(57) ABSTRACT

A microporous polymeric composition including a matrix polymer having a fractional free volume of at least 0.1 and dispersed particles having a hypercrosslinked polymer.

24 Claims, 12 Drawing Sheets

(51) Int. Cl.
| | |
|---|---|
| *B01D 61/36* | (2006.01) |
| *B01D 69/14* | (2006.01) |
| *B01D 71/44* | (2006.01) |
| *B01D 71/82* | (2006.01) |
| *B01D 71/76* | (2006.01) |
| *C08L 65/04* | (2006.01) |
| *B01D 69/02* | (2006.01) |
| *C08L 49/00* | (2006.01) |
| *B01D 67/00* | (2006.01) |
| *B01D 71/24* | (2006.01) |
| *B01D 53/22* | (2006.01) |
| *C08J 5/18* | (2006.01) |
| *C08J 9/00* | (2006.01) |
| *B01D 69/06* | (2006.01) |

(52) U.S. Cl.
CPC ......... *B01D 67/0016* (2013.01); *B01D 69/02* (2013.01); *B01D 69/141* (2013.01); *B01D 71/24* (2013.01); *B01D 71/44* (2013.01); *B01D 71/76* (2013.01); *B01D 71/82* (2013.01); *C08J 5/18* (2013.01); *C08J 9/0061* (2013.01); *C08L 49/00* (2013.01); *C08L 65/04* (2013.01); *B01D 69/06* (2013.01); *B01D 2256/10* (2013.01); *B01D 2256/12* (2013.01); *B01D 2256/16* (2013.01); *B01D 2256/245* (2013.01); *B01D 2257/102* (2013.01); *B01D 2257/108* (2013.01); *B01D 2257/504* (2013.01); *B01D 2257/7025* (2013.01); *B01D 2258/0283* (2013.01); *B01D 2323/12* (2013.01); *B01D 2323/14* (2013.01); *B01D 2323/18* (2013.01); *B01D 2323/30* (2013.01); *B01D 2325/02* (2013.01); *C08G 2261/132* (2013.01); *C08G 2261/135* (2013.01); *C08G 2261/148* (2013.01); *C08G 2261/3424* (2013.01); *C08G 2261/45* (2013.01); *C08G 2261/612* (2013.01); *C08G 2261/76* (2013.01); *C08J 2201/0502* (2013.01); *Y02C 10/10* (2013.01); *Y02C 20/20* (2013.01); *Y02P 20/152* (2015.11); *Y02P 20/156* (2015.11)

(58) Field of Classification Search
CPC .... B01D 61/362; B01D 69/141; B01D 71/44; B01D 71/76; B01D 71/82; B01D 69/02; B01D 2258/0283; B01D 2257/504; C08L 65/04; C08L 49/00; Y02P 20/156; Y02P 20/152; Y02C 20/20; Y02C 10/10
See application file for complete search history.

(56) References Cited

U.S. PATENT DOCUMENTS

2013/0247756 A1   9/2013   Li et al.
2014/0212940 A1   7/2014   Yang

OTHER PUBLICATIONS

Shujun Xu, et al., "Recent Development of Hypercrosslinked Microporous Organic Polymers", Macromolecular Rapid Communications, vol. 34, No. 6, Mar. 25, 2013, pp. 471-484, XP055511346.
Wai Fen Yong, et al., "Highly permeable chemically modified PIM-1/Matrimid membranes for green hydrogen purification", Journal Materials Chemistry A, No. 44, Sep. 13, 2013, 13914-13925, XP055303181.
Search Report issued in foreign counterpart European Patent Application EP16798968.
Yong, W. F. et al., 'Highly permeable chemically modified PIM-1/Matrimid membranes for green hydrogen purification', Journal of Materials Chemistry A, 2013, vol. 1, iss. 44, pp. 13914-13925.
Wai Fen Yong et al., 'High performance PIM-1/Matrimid hollow fiber membranes for CO2/CH4, O2/N2 and CO2/N2 separation', Journal of Membrane Science 443 (2013) 156-169.
Alexandra F. Bushell et al., 'Nanoporous Organic Polymer/Cage Composite Membranes', Angewandte Chemie (International Edition), DOI:10.1002/anie.201206339.
Muntazim M Khan et al., 'Enhanced gas permeability by fabricating mixed matrix membranes of functionalized multiwalled carbon nanotubes and polymers of intrinsic microporosity (PIM)', Journal of Membrane Science 436 (2013) 109-120.

* cited by examiner

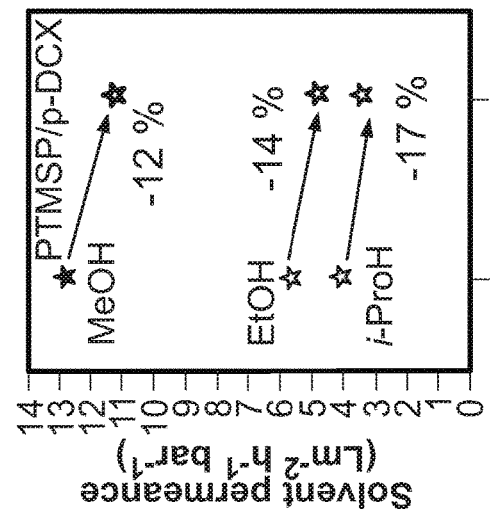
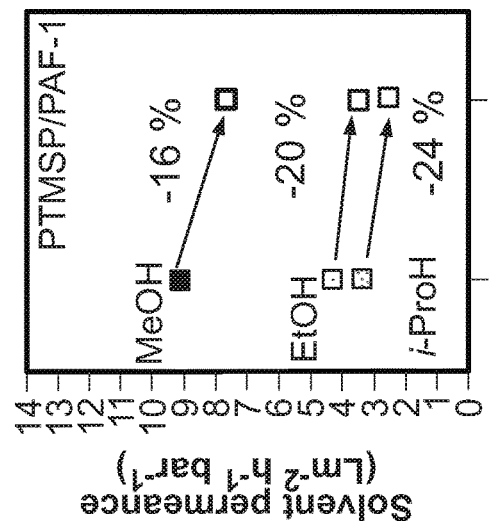
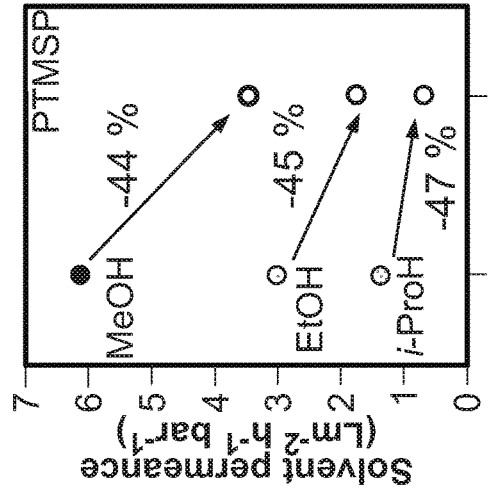
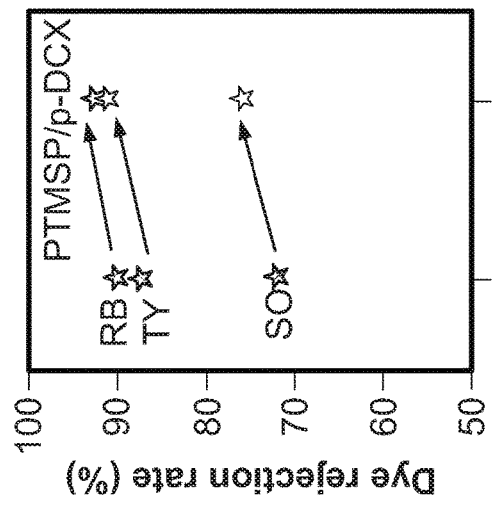
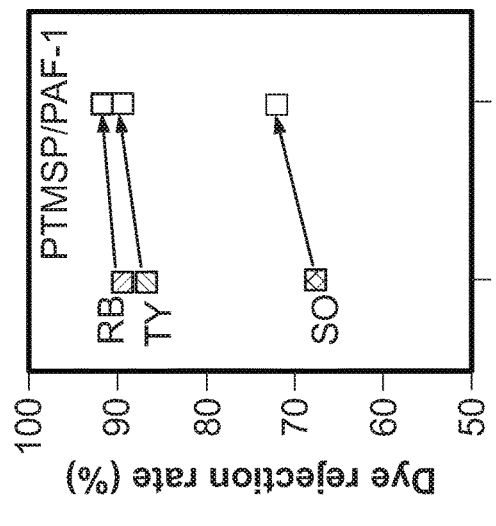
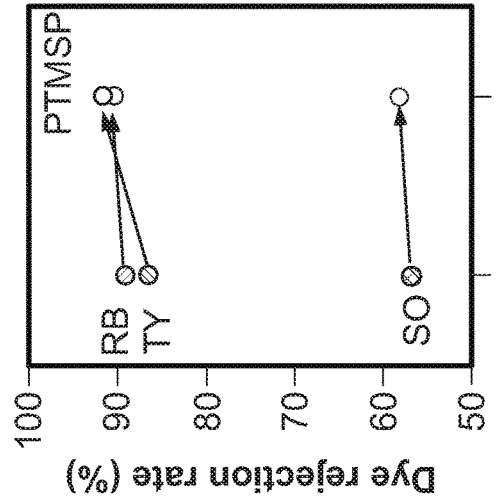

| | $I_3$ | $I_4$ |
|---|---|---|
| As-cast | 4.4 ± 0.2 % | 27.9 ± 0.2 % |
| Aged | 5.3 ± 0.3 % | 27.5 ± 0.5 % |

| | $I_3$ | $I_4$ |
|---|---|---|
| As-cast | 4.0 ± 0.2 % | 25.6 ± 0.2 % |
| Aged | 4.7 ± 0.3 % | 25.7 ± 0.2 % |

| | $I_3$ | $I_4$ |
|---|---|---|
| As-cast | 4.2 ± 0.1 % | 25.6 ± 0.3 % |
| Aged | 5.1 ± 0.3 % | 23.0 ± 0.3 % |

|     | $I_3$ | $I_4$ |
| --- | --- | --- |
| Wet | 8.9 ± 0.3 % | 14.6 ± 0.6 % |
| Dry | 5.3 ± 0.3% | 27.5 ± 0.5 % |

|     | $I_3$ | $I_4$ |
| --- | --- | --- |
| Wet | 10.2 ± 0.3 % | 13.7 ± 0.4 % |
| Dry | 5.3 ± 0.3% | 27.5 ± 0.5 % |

|     | $I_3$ | $I_4$ |
| --- | --- | --- |
| Wet | 9.1 ± 0.4 % | 13.8 ± 0.3 % |
| Dry | 5.3 ± 0.3% | 27.5 ± 0.5 % |

MICROPOROUS POLYMERIC COMPOSITION

RELATED APPLICATION

This application is a national phase under 35 USC 371 of International Patent Application: No. PCT/AU2016/050411 filed on 26 May 2016, which claims priority from. Australian Patent Application No. 2015901934 filed on 26 May 2015, the disclosures of which are incorporated herein by reference in their entirety.

FIELD

The present invention relates to microporous polymeric compositions, membranes formed of the compositions and use of the compositions, particularly as membranes, in fluid separation. The invention also relates to a process for separation using the microporous polymer composition. The invention will be described with particular reference to the use of membranes of the composition in fluid separation but it is to be understood that the polymeric compositions according to the invention are not intended to be limited to this particular application. The compositions generally speaking exhibit improved ageing characteristics.

BACKGROUND OF INVENTION

Fluid purification is an obligatory step for several industrial processes. For example, gas purification typically involves removal of water, carbon dioxide, or other unwanted gases that may interfere with the end use of the purified gas. Industrial gases that need to be purified before use include air, nitrogen, helium, argon, hydrogen, oxygen, and hydrocarbons.

Industrial gases also require careful purification before being released into the atmosphere. The most common contaminants present in these industrial gases are carbon dioxide, sulfur dioxide and trioxide, nitrogen oxides, hydrogen sulfide and small organic molecules. Removal of these impurities is important to reduce environmental pollution and minimize climate change. The most commonly used processes to purify gases on an industrial scale are liquid scrubbers (where a basic or acidic solution is used to absorb an acidic or basic gas, respectively), exchange resins (where immobilized bases or acids are used to absorb an acidic or basic gas, respectively), or membranes (which separate gases based on competitive adsorption, differences in diffusion rates, molecular discrimination, and/or sieving).

High purity solvents such as alcohols are commonly used in the food and pharmaceutical industry and other industries however, the energy consumption of traditional solvent purification techniques and stringent industrial requirements offsets the environmental benefits of recycling them. Polymer membranes are low carbon footprint solutions but their unstable and often insufficient separation performance has generally precluded them from solvent purification.

Separation membranes are likely to play an increasingly important role in reducing the environmental impact and the costs of industrial processes, because their use generates minimal amount of byproducts and has low energy footprint (Baker, 2002, *Ind. & Eng. Chem. Res.* 41 (6): 1393-141 1; oros, 2004, *AIChE J.* 50(10):2326-2334; Noble & Agrawal, 2005, *Ind. & Eng. Chem. Res.* 44(9):2887-2892). Commercially important gas separations include $H_2$ purification from light gases related to coal gasification, and $CO_2$ removal from hydrocarbons in natural gas processing. Dense membranes can separate gas mixtures based on competitive adsorption and/or differences in diffusion rates, whereas porous membranes can separate gas mixtures via molecular discrimination or sieving (Wijmans & Baker, 1995, *J. Membr. Sci.* 107(1-2): 1-21; Gin et al., 2008, *Macromol. Rapid Comm.* 29(5):367-389).

Certain organic polymers have been found to be particularly suitable for producing separation membranes on an industrial scale. Gas permeability in such polymer membranes is dominated by the diffusivity of the gas species throughout the polymer network. As the diffusivity is related to the mobility of gas molecules within the polymer, the differential transportation of gas species throughout a polymer membrane is believed to be dictated by two key parameters. These are (1) the accessible "free volume" of the polymer, and (2) the particular configuration of the pores and channels contributing to that free volume throughout the polymer mass, i.e. the "free-volume distribution".

A material with a high glass transition temperature (Tg), high melting point, and high crystallinity is preferred for most gas separations. Glassy polymers (i.e., polymers below their Tg) have stiffer polymer backbones than other polymers and therefore allow smaller molecules such as hydrogen and helium to permeate the membrane more quickly and larger molecules such as hydrocarbons permeate the membrane more slowly. Super-glassy polymers have a rigid structure, high glass transition temperatures, typically above 100° C.degree. C., 200° C. or higher, and have unusually high free volume within the polymer material. These materials have been found to exhibit anomalous behaviour for glassy polymers, in that they preferentially permeate larger, more condensable, organic molecules over smaller inorganic or less condensable organic molecules. Use of such polymers to separate condensable components from lower-boiling, less condensable components is described in U.S. Pat. No. 5,281,255, for example.

While glassy polymers are initially very porous, and ultra-permeable, they quickly pack into a denser phase becoming less porous and permeable. Polymer physical aging is a well-studied process where the convergence of glassy polymer chains collapses the inter-chain free volume, also known as fractional free volume (FFV) content, required for molecular transport via diffusion and adsorption. Other than physical aging, separation performances of polymer membranes can also deteriorate due to membrane compaction, where high pressures compress polymer chains and collapse molecular transportation pathways. In a commercial setting, membranes on polymeric substrates are generally allowed to age and compact to achieve steady-state permeance for continuous operation. This approach sacrifices the initial tantalising membrane performance for stability.

On the other hand, the free-volume distribution relates to how the free volume is arranged spatially within the polymer, by way of interconnected porosity and channels. It is the free volume distribution that is of interest in understanding the mechanisms underlying the separation of fluid mixtures, since its configuration will dictate which molecules filters through the polymer and which molecules may remain adsorbed on the surface of the free volume pockets. While two polymers may have the same total free volume, they may have vastly differing transport properties based upon a different free volume distribution.

From a thermodynamic point of view, the molecular arrangement of polymer chains giving rise to a detectable free volume is one of non-equilibrium. As a result, such polymers tend to evolve into lower and more stable energy states over time. Consequently, the corresponding free volume tends to correspondingly collapse and diminish. This process is commonly referred to as "relaxation" or "physical ageing" of the polymer. In the context of separation membranes, this phenomenon can dramatically affect the available free volume and free volume distribution for gas separation purposes. Indeed, a common problem affecting the performance of separation membranes is their reduced capability to maintain their permeability characteristics over time due to such physical ageing effects causing a dramatic reduction of the available free volume.

This degradation in properties hampers the use of glassy polymers in industrial applications. Several approaches have been explored to increase or stabilize the initially high gas permeabilities of glassy polymers such as PTMSP. These include using physical blends, polymer cross-linking, copolymer synthesis and functionalization. International Patent Publication WO 2014/078914 and Lau et al. (*Angew Chem* 2014, 126, 5426-5430) describes the addition of PAF-1 to super glassy polymers to reduce or eliminate the effects of aging. While the use of PAFs is effective, their preparation and use significantly increases the complexity and cost of the microporous composition.

An opportunity therefore remains to develop new polymer compositions suitable for use as separation membranes that exhibit improved permeability properties such as an extended period of time over which permeability is maintained (i.e. membranes that show reduced or no aging effects). Membranes prepared with such compositions should be useful for separation processes, including but not limited to gas-phase separations and gas-liquid separations.

SUMMARY OF INVENTION

Accordingly, we provide a microporous polymeric composition comprising a matrix polymer having a fractional free volume of at least 0.1 and dispersed particles of hypercrosslinked polymer.

In one set of embodiments the hypercrosslinked polymer comprises optionally substitute aryl groups (Ar) covalently linked through methylene bridging groups ($CH_2$) to form, for example, —$(Ar—CH_2—Ar—CH_2)_n$— wherein n is the number of repeating units.

The matrix polymers used in the composition are generally glassy polymers and preferably super-glassy polymers.

In one set of embodiments the matrix polymer having a fractional free volume of at least 0.1 comprises at least one selected from the group consisting of polymers of intrinsic microporosity (PIMs), thermally rearranged (TR) polymers, hyperbranched polymers and substituted polyacetylenes, preferably from substituted polyacetylenes and PIMs and more preferably substituted polyacetylenes.

In a preferred set of embodiments the weight ratio of matrix polymer to hypercrosslinked polymer is in the range of from 1:1 to 100:1 preferably 4:1 to 50:1, more preferably 4:1 to 25:1.

In preferred sets of embodiments the polymeric composition comprises at least 5% by weight (preferably 5% to 25% by weight) hypercrosslinked polymer and at least 50% by weight (preferably 60% to 95% by weight) matrix polymer (preferably substituted polyacetylene and/or PIM more preferably substituted polyacetylene), based on the weight of the microporous polymeric composition.

In a further aspect there is provided a microporous polymeric composition as herein before described in the form of a membrane.

In yet a further set of embodiments there is provided a method of preparing microporous polymeric composition comprising the steps of:
(a) dissolving a matrix polymer in a liquid to form a polymer solution,
(b) introducing porous particles of the hypercrosslinked polymer to the polymer solution, and
(c) subsequently removing at least a portion of the liquid to thereby form the microporous material.

In a further aspect there is provided a method of performing size-selective separation of a component in a mixture selected from plurality of fluids or a solid and a fluid, the method comprising the steps of:
providing the mixture comprising a fluid component;
contacting the mixture with one surface of a membrane comprising a matrix polymer having a fractional free volume of at least 0.1 and a hyper-crosslinked polymer (wherein preferably the characteristics of the combined matrix polymer and a hyper-crosslinked polymer composition is such that the fractional free volume of the polymer does not decrease by more than 10% over a time of at least 50 days);
applying a pressure difference across the membrane; and
isolating a filtered composition from the opposite surface of the membrane to provide a filtered composition enriched in one component of the mixture.

In one set of embodiments the mixture is a gaseous mixture.

In a further set of embodiments the mixture is a mixture of liquids or mixture of liquid and a solute or dispersed solid.

DETAILED DESCRIPTION

The term polymers of intrinsic microporosity (PIM) refers to polymers that demonstrate microporosity without possessing cross-links. They behave like molecular sieves in the solid state, because they have rigid, contorted molecular structures that are unable to pack efficiently. Examples of PIMs include polyphtalocyanines, polyspirobisindanes and polybenzidioxanes.

The term fluid is used herein to refer to substances that continually deform under applied shear and include liquids and gasses. Fluid separation includes separation of two gasses, separation of two liquids, separation of a liquid and a gas and separation of a fluid from a solid.

The term hyperbranched polymers belong to a class of synthetic tree-like macromolecules including dendritic polymers (Gao and Yan, 2004). They are polymers with densely branched structure and a large number of end groups. Dendritic polymers include dendrimers which have completely branched star-like topologies and hyperbranched polymers which have imperfectly branched or irregular structures. Dendritic polymers including hyperbranched polymer molecules are composed of repeating units emanating from a central core. The core is characterised by its functionality, which is the number of chemical bonds through which it can be connected to the external parts of the molecule.

A polymer's free volume is defined as the difference between the specific polymer volume in its glassy or rubbery state and the occupied volume associated with the material in its crystalline configuration extrapolated to zero Kelvin. The fractional free volume is the ratio between that difference and the polymer volume in its glassy or rubbery state at the given temperature. The fractional free volume can therefore be expressed in vol. % or volumetric fraction. The fractional free volume is therefore a measure of the residual "voids" that remain between the polymeric chains when these are inter-locked in their 3D arrangements.

The matrix polymer of the microporous polymeric composition has a fractional free volume (FFV) of at least 0.1 and in some embodiments the FFV is at least 0.2. The fractional free volume where referred to herein is determined according to the method described in the book edited by Y. C Jean, P. E. Mallon & D. M. Schrader "Principles and Applications of Positron and Positronium Chemistry", published by World Scientific Publishing Co. Pte. Ltd.

The term glassy polymers, which includes the range of super-glassy polymers, refers to polymers which have a glass transition temperature (Tg) above the temperature at which they are intended to be used in fluid separation. Typically the glassy polymers have a Tg of at least 50° C. and often a much higher Tg such as at least 100° C. They are preferably completely glassy under the conditions in which they are to be used.

Super-glassy polymers have a rigid structure, high glass transition temperatures, typically above 100° C., more preferably above 200° C. and have unusually high free volume within the polymer material.

As used herein, the articles "a" and "an" refer to one or to more than one (i.e. to at least one) of the grammatical object of the article. By way of example, "an element" means one element or more than one element.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

As used herein, the term "Barrer" is a non-SI unit of gas permeability, wherein 1 Barrer=$10'''$ $(cm^3$ gas$)\cdot cm\cdot cm''^{2}\cdot s''$ mrnHg', or 1 Barrer=$10''^{10}$ $(cm^3$ gas$)\cdot cm\cdot cm''^{2}\cdot s'^{1}\cdot cmHg'^{1}$. The term "$cm^3$ gas" represents a molar quantity of gas (i.e., the quantity of gas that would take up one cubic centimeter at standard temperature and pressure, as calculated via the ideal gas law), rather than a true volume. The term "cm" represents the thickness of the material which permeability is being evaluated, and the term "$cm'^{2}$" represents the reciprocal of the surface area of that material.

As used herein, the term "polymer" refers to a molecule composed of repeating structural units typically connected by covalent chemical bonds. The term "polymer" is also meant to include the terms copolymer and oligomer.

"Pervaporation" (PV) (or pervaporative separation) refers to a separation process whereby a liquid feed solution contacts a membrane, a portion of the feed permeates through the membrane, and the permeate exits the membrane as a vapor. The term "pervaporation" is a contraction of the words "permeation" and "evaporation". "Retentate" refers to that portion of the feed mixture which remains after contact with the membrane; i.e. the portion that has not permeated into the membrane. "Solvent" refers to a liquid that can dissolve a solid material or a liquid material. Pervaporation is a processing method for the separation of mixtures of liquids by partial vaporization through a membrane. "Permeate" is the portion of the feed mixture which penetrates the membrane.

The microporous polymeric composition comprises hypercrosslinked polymer particles. The hypercrosslinled polymer particles are dispersed within the matrix polymer having a fractional free volume of 0.1 (preferably 0.2).

Hypercrosslinked polymers are a class of polymers known in the art and can be prepared by processes and using materials which are relatively inexpensive and readily available. As a result they can generally be used to provide the microporous polymeric compositions with much greater economy than the corresponding compositions prepared using porous aromatic framework (PAF) particles which have a uniform architecture and require relatively complex monomers or polymer precursors such as for the tetrahedrally arranged aromatic groups in the diamond-like framework of PAF-1.

We have found that despite the less uniform architecture of hypercrosslinked polymers compared with PAFs, such as PAF-1, the microporous polymeric compositions comprising hypercrosslinked polymer particles exhibit excellent resistance to the ageing problem of the super-glassy polymer matrix composition. Indeed despite the less uniform architecture of hypercrosslinked polymers we have found that the microporous polymeric composition provides a gas permeability of membranes which is more than 80% of the initial permeability after 100 days. Pure gas permeabilities were measured over an extended period of time with a time-lag apparatus. As illustrated in FIG. 1, gas permeabilities were measured for neat PTMSP and mixed-matrix membranes. The initial permeabilities (t=0) were different due to differences in nature of the materials, casting conditions and thickness. For neat PTMSP membrane, large decreases of the gas permeabilities were observed. The decreases observed (by nearly 40%) were typical for neat PTMSP membranes and demonstrates the need to stabilize the gas transport properties of the membrane over time. The $CO_2$ permeability (42,000 Barrer) for the PTMSP/pDCX (p-dichloroxylene hypercrosslinked polymer) membrane was stable over at least 60 days. Preferably the microporous polymeric composition provides a gas permeability of membranes which is more than, 90% after 100 days.

Further we have found that the fractional free volume (FFV) of the matrix polymer does not decrease by more than 10% over a period of 50 days. Bulk Positron Annihilation Lifetime Spectroscopy experiments can be performed to characterize FFV loss in the material using an EG&G Ortec fast-fast coincidence system with fast plastic scintillators and a resolution function of 260 ps FWHM ($^{60}$Co source with the energy windows set to $^{22}$Na events). Due to the long lifetimes, and the low counting rate, the coincidence unit was removed and the range of the TAC extended to 200 ns. The film samples were stacked (>1.5 mm thickness) on either side of a 30 µCi $^{22}$NaCl source sealed in a 2.54 µm thick Mylar envelope (source correction 1.605 ns and 2.969%) and measured at ~5×$10^{-7}$ Torr. At least five spectra of 4.5 million integrated counts were collected with each spectrum taking about 4.6 h to collect. Data analysis was performed using the program MELT. The spectra were best fitted with five components with the shortest lifetime fixed to 125 ps, characteristic of p-Ps annihilation. For the long lifetimes obtained, the Tao-Eldrup model, traditionally used for calculating mean pore sizes from mean o-Ps lifetimes is not valid; therefore, the mean free path (nm) of the pores was calculated using the Rectangular Tao Eldrup (RTE) model.

Specific examples of hypercrosslinked polymers which may be used in preparation of hypercrosslinked polymer particles are disclosed by Davankov and coworkers (U.S. Pat. No. 3,729,457, US Publn 2003/0027879; *Macromolecules* 29 (1996) 8396; *J. Poly. Sci Part A: Polym. Chem.* 35 (1997) 3847; *J. Poly. Sci Part A: Polym. Chem.* 37 (1999) 1451 and Reactive and Functional Polymers, 66 (2006) 768-779. Examples of hypercrosslinked polymers are also described by Hradil et al., *React and Functl. Polym.*, 67 (2007) 432-441 and Xu et al., "Recent Development of Hypercrosslinked Microporous Organic Polymers", *Macromol. Rapid Commun.* (2013), 34, 471-484.

The hypercrosslinked polymer may prepared by cross-linking of an optionally substituted aryl monomer or polymer thereof with a crosslinker preferably selected from chloromethyl methyl ether, chloromethyl ethyl ether, chloromethyl polyether or dimethylformal, bischloromethylated benzene such as p-xylylene dichloride, bis chloromethylated biphenyl, 4,4'-bis[4-(chloromethyl)phenyl]butane, tetrachloromethane, sulphur halides, and tetrachloromethane and mixtures thereof preferably in the presence of Friedel Crafts catalyst.

In one set of embodiments the preparation of such hypercrosslinked polymer may involve cross linking of polymers of one or more of styrene, divinylbenzene and vinylbenzylchloride. Examples of crosslinking agent include those selected from the group consisting of chloromethyl methyl ether, chloromethyl ethyl ether, chloromethyl polyether or dimethylformal, bischloromethylated benzene such as p-xylylene dichloride, bis chloromethylated biphenyl, 4,4'-bis[4-(chloromethyl)phenyl]butane, tetrachloromethane, sulphur halides, and tetrachloromethane. It will be appreciated, however that a wide range of crosslinking agents may be used. Crosslinking is generally conducted in the presence of a Friedel Crafts catalyse such as chlorides of tin(IV), iron (III) and aluminium (III). The process generally utilises a solvent in which the polymer is swellable such as aromatic or aliphatic hydrocarbons and chlorinated hydrocarbons such as dichloroethane, chloroform, nitrobenzene, toluene octane and the like solvents. In one embodiment a polymer of chloromethylstyrene is cross linked using a Friedel Crafts catalyst.

In one set of embodiment the hypercrosslinked polymers are prepared by post polymerisation cross linking. In a further set of embodiments the hypercrosslinked polymers are prepared by direct Friedel Crafts alkylation (without the need for a precursor crosslinked polymer) of a monomer composition comprising aryl monomers comprising two or more chloromethyl groups such as dichloroxylylene, bis (chloromethyl)biphenyl and bis(chloromethyl)anthracene.

The surface area of the hypercrosslinked polymer is generally increased with increasing amounts of Friedel Crafts catalyst.

The hypercrosslinked polymer particles generally comprise a polymer of optionally substituted aryl groups covalently bonded to one or more optionally substituted aryl by at least one methylene group. In one set of embodiments the hypercrosslinked polymer comprises optionally substitute aryl groups (Ar) covalently linked through methylene bridging groups ($CH_2$) to form —(Ar—$CH_2$—Ar—$CH_2$)$_n$— wherein n is the number of repeating units.

Generally each optionally substituted aryl is covalently linked to one or more optionally substituted aryl by bridging methylene groups between adjacent optionally substituted aryl. In one set of embodiments the methylene bridging groups form covalent links between two adjacent aryl groups to form a six membered carbocyclic ring that is attached to the aryl rings. The methylene bridge may provide a six membered ring between adjacent aryl groups to provide, for example, 9,10-dihydroanthracene structure where the aryl groups are substituted benzene.

In one set of embodiments the hypercrosslinked polymer particles are formed by post polymerisation crosslinking of polymers containing optionally substituted aryl preferably selected from optionally substituted styrene, divinyl benzene, vinylbenzyl chloride and optionally substituted aryl comprising at least two chloromethylene substituents. The polymerisation and or post-polymerisation cross-linking (preferably both) may be conducted with Friedel Crafts catalysis.

In one set of embodiments the hypercrosslinked polymer is a polymer of a substituted aryl monomer comprising comprising at least two chloromethylene substituents, preferably prepared by Friedel Crafts catalysed polymerisation.

In a further set of embodiments the hypercrosslinked polymer is derived from polymerization of an optionally substituted aryl monomer with an external crosslinker preferably selected from the group consisting of chloromethyl methyl ether, chloromethyl ethyl ether, chloromethyl polyether or dimethylformal, bischloromethylated benzene such as p-xylylene dichloride, bis-chloromethylated biphenyl, 4,4'-bis[4-(chloromethyl)phenyl]butane, tetrachloromethane, sulphur halides, and tetrachloromethane and mixtures thereof preferably in the presence of a Friedel Crafts catalyst.

In a preferred embodiment the hypercrosslinked polymer particles are formed by Friedel Crafts catalysed condensation of a monomer composition comprising an aromatic monomer comprising at least two chloromethyl substituents.

In one specific embodiment in which the hypercrosslinked polymer comprises optionally substituted aryl groups (Ar) covalently linked through methylene bridging groups ($CH_2$) to form —(Ar—$CH_2$—Ar—$CH_2$) the repeating unit is at least one of formula I and formula II:

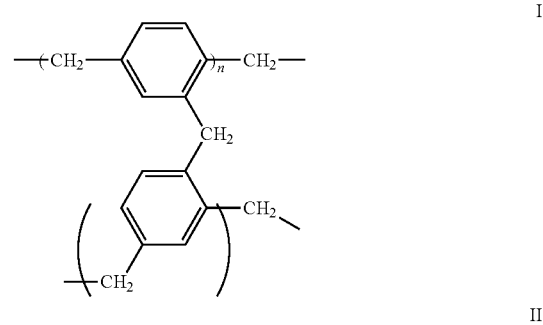

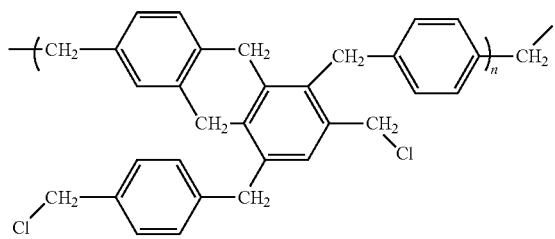

wherein n represents the number of repeating units in cross-linked chains.

It will be understood by those skilled in the art that hypercrosslinked polymers may comprise a complex network in which the number (n) of repeating units is extremely high and indeed difficult to determine with accuracy.

Another approach to hypercrosslinked polymers has been reaction of multilithiated aromatics such as 4,4'-dilithiobiphenyl with carbonates such as dimethylcarbonate.

This specification refers to aryl and substituted aryl. Aryl groups include carbocyclic aryl and heterocyclic aryl. Examples of carbocyclic aryl may be selected from the group consisting of benzene, biphenyl, naphthylene, tetrahydronaphthylene, idene, azulene, anthracene and the like.

Examples of heterocyclic aryl may be selected from the group consisting of furanyl, thiophenyl, 2H-pyrrolyl, pyrrolinyl, oxazolinyl, thiazolinyl, indolinyl, imidazolidinyl, imidazolinyl, pyrazolyl, pyrazolinyl, isoxazolidinyl, isothiazolinyl, oxadiazolinyl, triazolinyl, thiadiazolinyl, tetrazolinyl, pyridinyl, pyridazinyl, pyrimidinyl, pyrazinyl, triazenyl, indolyl, isoindolinyl, benzimidazolyl, benzoxazolyl, quinolinyl, isoquinolinyl, and the like.

Examples of optional substituents include $C_1$ to $C_4$ alkyl such as methyl and ethyl, $C_2$ to $C_4$ alkenyl such as vinyl, halo-$C_1$ to $C_4$ alkyl such as chloromethyl, amino, $C_1$ to $C_4$ alkylamino, di-($C_1$ to $C_4$ alkyl)amino and sulfonate.

The number of optional substituents may be 0 to 4 preferably 0 to 3.

The hypercrosslinked polymer particles used in the microporous polymeric composition may be prepared in a range of particle sizes. Generally the particles are of size 20 nm to 200 µm. The pores of the porous hypercrosslinked polymer particles may have a median diameter of less than about 100 nm. In one embodiment, the pores can have a median diameter of about 0.10 nm to about 10 nm, with no particular distribution of shape or size required. The porous particles may be microporous. The particles in one set of embodiments have pore diameters of less than about 2 nm (micropores).

In a preferred set of embodiments the hypercrosslinked polymer has a Brunauer-Emmett-Teller (BET) surface area in the range of from 500 $m^2$/g to 2500 $m^2$/g such as in the range of from 1000 $m^2$/g to 2500 $m^2$/g or from 1500 $m^2$/G to 2500 $m^2$/g.

Super glassy polymers that can provide for a fractional free volume of at least 0.1 (preferably at least 0.2) include polymers of intrinsic microporosity (PIMs), thermally rearranged (TR) polymers, hyperbranched polymers and substituted polyacetylenes. Notably, not all polymers within these general classes will inherently have a fractional free volume of at least 0.1. The fractional free volume of a given polymer can be determined as outlined herein.

The preferred matrix polymers are substituted polyacetylenes and PIMs.

A further class of polymer with high fractional free volume is that of substituted polyacetylenes. Substituted polyacetylenes are typically more thermally stable than polyacetylene in air (Masuda, 2007, *J. Polym. Sci. Part A: Polym. Chem.* 45:165), with their stability increasing with increasing number or bulkiness of the substituents. Substituted polyacetylenes derived from aromatic disubstituted acetylenes are highly stable (e.g., no oxidation or degradation in air at 160° C. after 20 h). Substituted polyacetylenes derived from aliphatic disubstituted acetylenes are moderately stable at room temperature, while they easily degrade at higher temperature. Substituted polyacetylenes typically do not undergo degradation in vacuum at 120° C. Tensile measurements at 25° C. show that polyacetylenes with phenyl groups are generally hard and brittle, whereas those with long <<-alkyl groups are soft and ductile. Some substituted polyacetylenes are known to have high gas permeability (Masuda et al., 1983, *J. Am. Chem. Soc.* 105:7473-7474).

The fractional free volume of the polymers particularly suitable for use as the matrix polymer in the invention is at least 0.10 and may be higher, such as at least 0.20 or at least 0.25. For example, poly(1-trimethylsilyl-1-propyne) [PTMSP], a silicon-substituted polyacetylene, has a typical fractional free volume of about 0.28 according to this method, poly(4-methyl-2-pentyne) [PMP] has a fractional free volume of about 0.27 and Teflon™ AF, a block copolymer of a fluorodioxole unit and a tetrafluoroethylene unit, has a fractional free volume of about 0.33, depending on grade. Other glassy polymers having a fractional free volumes of at least 0.10 but less than 0.2, such as for polycarbonate (0.164), or for 6FDA-6FpDA polyimide (0.190). Rubbery polymers also have lower fractional free volumes, such as 0.18 for silicone rubber.

Non-limiting examples of polymer materials that fall within the definition of glassy, high-free-volume, high-permeability materials useful for forming the membranes and carrying out the processes of the invention include:

(i) Substituted acetylenes, having the general structural formula:

(1)

where $R_1$ and $R_2$ are independently hydrogen, a halogen, phenyl or a linear or branched $C_1$-$C_4$ alkyl group, and n is a positive integer.

(ii) disubstituted polyacetylenes, having the general formula:

(2)

wherein $R_1$ is chosen from the group consisting of $C_1$-$C_4$ alkyl and phenyl, and wherein $R_2$ is chosen independently from the group consisting of hydrogen and phenyl.

(iii) Silicon-containing polyacetylenes, having the general structural formula:

(3)

where $R_1$ is a linear or branched $C_1$-$C_4$ alkyl group, $R_2$ and $R_3$ are independently linear or branched $C_1$-$C_6$ alkyl groups, and $R_4$ is a linear or branched $C_1$-$C_{12}$ alkyl or aryl group, and m is a positive integer.

(iv) Silicon-containing polyacetylenes, having the general structural formula:

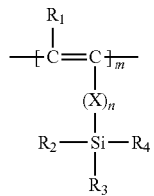

(4)

where $R_1$ is phenyl or a linear or branched $C_1$-$C_4$ alkyl group, $R_2$ and $R_3$ are independently linear or branched $C_1$-$C_6$ alkyl groups, $R_4$ is a linear or branched $C_1$-$C_{12}$ alkyl or aryl group, and X is phenyl or a $C_1$-$C_3$ alkyl group, and m and n are independently positive integers.

(v) Germanium-containing polyacetylenes, having the general structural formula:

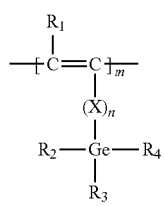

(5)

where $R_1$ is a linear or branched $C_1$-$C_4$ alkyl group, $R_2$ and $R_3$ are independently linear or branched $C_1$-$C_6$ alkyl groups, $R_4$ is a linear or branched $C_1$-$C_{12}$ alkyl or aryl group, and X is a $C_1$-$C_3$ alkyl group, and m and n are independently positive integers.

(vi) Polymers and copolymers of perfluoro-2,2-dimethyl-1,3-dioxole.

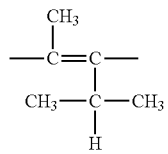

(6)

Within the class of substituted polyacetylenes, poly (I-(trimethylsilyl)-I-propyne) (PTMSP) is known for its high gas permeabilities but low selectivities ($O_2$ permeability=7,000 Barrer, $O_2/N_2$ selectivity=2) (Masuda et al., 1983, *J. Am. Chem. Soc.* 105(25):7473-7474). Because of its unique gas transport properties, this glassy polymer has great potential for pervaporation (i.e., separation of mixtures of liquids by partial vaporization through a porous membrane) or gas separation applications, such as $CO_2$ capture. Indeed, the $CO_2$ permeability of PTMSP is 28,000 Barrer (Ichiraku et al., 1987, *J. Membr. Sci.* 34(1):5-18), whereas traditional polymers typically exhibit $CO_2$ permeability values below 100 Barrer (Du et al., 2012, *Energy & Envir. Sci.* 5(6):7306).

In a preferred set of embodiments the polymer matrix having a fractional free volume of at least 0.1 (preferably at least 0.2) is a polyacetylene polymer which may, for example, comprises at least one selected from the group consisting of poly(1-(trimethylsilyl)-1-propyne) (PTMSP), poly(1-(dimethyl-n-propylsilyl)-1-propyne), poly(1-(dimethyl-n-butylsilyl)-1-propyne), poly(1-phenyl-1-propyne) poly (diphenylacetylene), poly (t-butylacetylene), poly(1-phenyl-2-p-trimethylsilylphenyl-acetylene), poly(1-phenyl-2-p-hydroxyphenyl-acetylene), poly(4-methyl-2-pentyne), co-polymers thereof, and combinations thereof.

In one embodiment, the substituted polyacetylene is PTMSP.

In one embodiment, the matrix polymer is a polymer of intrinsic microporosity(PIM). PIMs are generally defined as polymers that contain a tetrahedral carbon as a point of contortion. PIMs can comprise organic planar macromolecules interconnected by rigid linkers. The linkers have at least one point of contortion, which results in the two planar macromolecules being connected and rigidly linked together in a non-coplanar orientation. The point of contortion may be, for example, a spiro group, a bridged ring moiety or a covalent bond around which there is restricted rotation. The chains and macromolecules forming the structure of PIMs are therefore prevented from being efficiently packed together, thus resulting in formation of extended voids throughout the whole polymer network. A particular advantage of PIMs is that their intrinsic porosity results mainly from the peculiar and "forced" arrangements of their macromolecules, and does not significantly derive from the thermal history of the material. Examples of PIMs are discussed by Dawson et al. "Nanoporous organic polymer networks" *Progress in Polymer Science* 37 (2012) 530-563 and include polyphtalocyanines, polyspirobisindanes and polybenzidioxanes.

Thermally rearranged polymers (TR polymers) are generally defined as polymers that undergo a structural rearrangement upon heating, resulting in a dramatic increase of their free volume. Their fractional free volume can reach values up to 0.3, making these polymers excellent candidates for gas separation applications. In general, the structure of TR polymers comprises a hetero-aromatic domain, and includes polybenzoxazoles and polybenzimidazoles. These polymers are characterized by interconnected microporosity within a glassy polymer matrix. During thermal rearrangement, typically at 450° C., the interconnected porosity forms through a solid-state conversion of polyimide to polybenzoxazole. The pore size of TR polymers presents a bimodal distribution with pores of 0.3-0.4 nm and 0.7-0.9 nm in size, which provide rapid and selective diffusion for small gas and ion molecules. Also, the pore size of TR polymers can be tuned by simple thermal treatment.

The microporous polymeric membrane, in one set of embodiments, comprises a weight ratio of matrix polymer to hypercrosslinked polymer is in the range of from 1:1 to 100:1 preferably 4:1 to 50:1, more preferably 4:1 to 25:1.

The microporous polymeric composition preferably comprising at least 5% by weight (preferably 5% to 25% by weight) hypercrosslinked polymer and at least 50% by weight (preferably 60% to 95% by weight) polyacetylene polymer, based on the weight of the microporous material.

In one set of embodiments the microporous polymeric composition is used in gas separations, liquid separations or separation of solids from liquids. For use in fluid separation the composition is preferably in the form of a membrane.

Typically membranes have a thickness in the range of from 10 nm to 100 microns. Membranes made from the polymeric composition containing a substituted polyacetylene or PIM matrix are generally less than 100 microns, preferably 30-100 microns in thickness. Membranes made with polyimides as matrix polymers are generally of thickness in the range of 10-500 nm.

In one set of embodiments there is provided a method of preparing microporous polymeric composition comprising the steps of:
(a) dissolving a matrix polymer in a liquid to form a polymer solution,
(b) introducing porous particles of the hypercrosslinked polymer to the polymer solution, and
(c) subsequently removing at least a portion of the liquid to thereby form the microporous material.

Following introduction the particles of hypercrosslinked polymer the polymer solution comprising polymer particles may be formed into a membrane Membranes may be prepared by solvent casting. The different compounds—matrix polymer (such as PTMSP) and hypercrosslinked polymer particles (such as pDCX)—and solvent (such as chloroform) were stirred at room temperature until complete dissolution of PTMSP and formation of a homogeneous solution. The membranes may be cast on a suitable receptable (such as a glass petri plates or porous substrates) and dried until complete removal of the solvent.

Membranes of the microporous polymeric composition may be used in a range of separation processes including separation of fluids such as a mixture of gases, a liquid, gas mixture, a mixture of liquids, a mixture of a liquid and solute (which may be dissolved in the liquid), mixture of liquid and particulate solid dispersed in the liquid, a mixture of gas and particulate solid dispersed in the gas.

Apart from fluids in general, the membrane of the present invention can advantageously find applications in various industrial gas separation processes. Membranes according to the invention can find application in processes for the pre-combustion capture of $CO_2$ and $N_2$, and they show potential applicability for the separation of $CO_2$ from flue gases.

The invention further provides a process for separating a component of a first fluid mixture, comprising the following steps:
(a) providing a membrane having a feed side and a permeate side, the membrane comprising a fractional free volume of at least about 0.10 (preferably at least about 0.2), and dispersed hypercrosslinked polymer particles within the matrix;
(b) passing the first fluid mixture across the feed side;
(c) providing a driving force for transmembrane permeation;
(d) withdrawing from the permeate side a second fluid mixture enriched in the component compared with the first fluid mixture.

The fluid mixture to be separated can be gases or liquids. The membranes are believed to be particularly useful for the separation in the gas phase of a condensable organic component from a less condensable organic or inorganic compound, or of $C_3+$ hydrocarbon components from multicomponent gas streams, such as natural gas and refinery gas streams. The membranes are also useful for liquid-phase separations, such as pervaporation, including the separation of dissolved organics from water, and the separation of organic liquid mixtures. In one embodiment the organic liquid is an alcohol such as selected from the group consisting of methanol, ethanol, propanol and mixtures thereof. In one set of embodiments the mixture is an ethanol water mixture.

There is a pressing need for PV membranes that combine a high selectivity with an elevated pervaporation flux, and moreover show long-term stability in strongly swelling organic solvents. The number of commercial PV membranes that combine a high selectivity with an elevated pervaporation flux, and moreover show long-term stability in organic solvents is however restricted at present. PV has not yet realised a breakthrough in industrial processes, despite its clear environmental and economic advantages and the great application potential in the process industry. Several polymers have been used for the synthesis of PV membranes, e.g. polydimethylsiloxane (PDMS), polytetrafluoroethylene (PTFE), ethylene-propylene-diene terpolymer (EPDM), polyurethaneurea (PU), poly(ether-block-amide) (PEBA) and poly(1-trimethylsilyl-1-propyne) (PTMSP).

In a further embodiment the membrane is used in purification of liquids. The permeance enhancements in the membranes comprising matrix polymer of fractional free volume of at least 0.1 (preferably at least 0.2) and dispersed hypercrosslinked particles were also accompanied by higher selectivities for certain liquids over other liquids and solutes. For example over dyes (a proxy for pharmaceutics), overcoming the trade-off relationship between permeance and selectivity. The separation performance of membranes of the invention generally outperform commercially available polymer membranes. These membranes are optimal for transforming batch processes like alcohol purification into continuous operations; streamlining current industrial practices.

In a second exemplary process aspect, the process of the invention can be pervaporation. In this case, the feed fluid is liquid and the permeate fluid is in the gas phase. The process of the invention may then include the following steps:
(a) providing a membrane having a feed side and a permeate side, the membrane comprising a matrix polymer having a fractional free volume of at least 0.1 (preferably 0.2), preferably having a glass transition temperature, $T_g$, of at least about 100° C. within which hypercrosslinked polymer particles are dispersed;
(b) passing a liquid mixture containing a component to be separated across the feed side;
(c) providing a driving force for transmembrane permeation;
(d) withdrawing from the permeate side a gas or vapour mixture enriched in the component compared with the liquid mixture.

In the case of pervaporation, the driving force for transmembrane permeation may often be conveniently provided, at least in part, by subjecting the permeate stream to condensation, thereby lowering the vapour pressure on the permeate side.

Pervaporation is used industrially to remove water from organic liquids, such as dehydration of alcohols, and is beginning to be used to remove organic compounds from water, such as waste water, process water, groundwater or water desalination. Much work has also been done at the research level on separation of organic liquids from one another, such as to separate close-boiling liquids or to break azeotropes. The membranes of the invention are useful for the following representative, but non-limiting, pervaporation processes:
(a) Separation of organic compounds from water. In this regard, the membranes of the invention are particularly useful for:
Separating mixture comprises water and one or more organic compounds selected from the group consisting of alcohols, phenols, chlorinated hydrocarbons, pyridines, furans such as THF, dimethylformamide (DMF), and ketones.
Removal of hydrocarbons such as benzene, toluene and xylene from process and wastewaters.
Separation of alcohols and/or ketone from product, process or waste streams.

Removal of chlorinated solvents from process and wastewaters.

Recovery of flavours and essences in the food processing industry.

Treatment of polluted groundwater to remove volatile organics.

Treatment of organic-containing condensate waters from various sources.

(b) Separation of mixed organic components, particularly those having close boiling points or forming azeotropes. In these processes, the membranes of the invention that exhibit exceptional chemical resistance, such as filled PMP membranes, are particularly valuable.

Further liquid phase examples include the separation of one organic component from another organic component, e.g. to separate isomers of organic compounds. Mixtures of organic compounds which may be separated using the polymer membrane described in the present invention include: ethylacetate-ethanol, diethylether-ethanol, acetic acid-ethanol, benzene-ethanol, chloroform-ethanol, chloroform-methanol, acetone-isopropylether, allylalcohol-allylether, allylalcohol-cyclohexane, butanol-butylacetate, butanol-1-butylether, ethanol-ethylbutylether, propylacetate-propanol, isopropylether-isopropanol, methanol-ethanol-isopropanol, and ethylacetate-ethanol-acetic acid.

In one set of embodiments the membrane of the invention is used in purification of an aqueous stream coming from hydrocarbon processing such as the Fischer-Tropsch reaction which comprises feeding said aqueous stream to one or more pervaporation units comprising the membrane obtaining an aqueous stream enriched in organic compounds (retentate side) and an aqueous stream enriched in water (permeate side), optionally feeding said aqueous stream enriched in organic compounds to a saturator obtaining a gaseous stream leaving the saturator, feeding said gaseous stream for further processing such as to a synthesis gas production plant.

For some gas and liquid separation processes, membranes incorporating matrix polymers, such as polyimides, polycarbonate and polysulfone, having fractional free volume lower than 0.20, are useful. These membranes may be prepared as generally described above. In this case, however, it is particularly important to disperse the hypercrosslinked polymer particles as uniformly within the separating membrane layer to open up the comparatively dense structure of the polymer matrix throughout and thereby improve the permeability of the material. A preferred form of the membrane in this case, therefore, is a composite membrane comprising a highly permeable polymeric support membrane, in which is dispersed the hypercrosslinked polymer particles.

In one set of embodiments the invention provides a method of selectively separating an alcohol such as methanol, ethanol, isopropanol or mixture thereof from an aqueous mixture, the method comprising: (a) providing a membrane comprising a microporous polymeric composition comprising a matrix polymer having a fractional free volume of at least 0.1 (preferably at least 0.2) and dispersed particles comprising hypercrosslinked polymer; and (b) contacting the aqueous mixture with the membrane whereby the alcohol selectively permeates through the membrane by pervaporation to selectively separate the alcohol from the aqueous mixture.

The membranes of the microporous polymeric composition may also be used in desalination. Desalination using the membrane may provide potable water or water for human consumption from sea water of saline ground water.

Specific examples of gas/gas separation in which membranes of the polymeric composition may be used include:

$$CO_2/N_2, CO_2/H_2, CO_2/CH_4, N_2/CH_4, H_2/N_2, O_2/N_2 \text{ and } CH_4/H_2$$

Specific examples of liquid separation in which the polymeric composition may be useful include water/alcohol and alcohols from dyes separation.

In a further embodiment the microporous polymeric composition in the form of a membrane is used in a process of organic solvent nanofiltration. Such a process may be used to purify solvents such as the alcohols methanol, ethanol, isopropanol and mixtures thereof. Organic nanofiltration may be used to remove solutes such as bioactive agents from solvents to allow purification of solvent to allow, for example, recycling and reuse of solvents. Bioactive agents such as pharmaceuticals, agrochemicals, toxicants may be removed. In further embodiments impurities are removed by nanofiltration.

Specific examples of separation of solids from liquids include separation of pigments from dyes and pharmaceuticals from solvents such as alcohol or water.

The invention will now be described with reference to the following examples. It is to be understood that the examples are provided by way of illustration of the invention and that they are in no way limiting to the scope of the invention.

BRIEF DESCRIPTION OF DRAWINGS

The Example is described with reference to the drawing.

In the drawings:

FIGS. 7A-F shows a series of six graphs the first three showing solvent permeation of methanol, ethanol and isopropanol of as-cast (solid square) and aged (empty square) 1 um thin (A) PTMSP, (B) PTMSP/PAF-1 and (C) PTMSP/p-DCX membranes supported on polycarbonate substrates. The second series of three show Rose Bengal (orange), Thiazole Yellow (green), and Safranine O (purple) dyes rejection rates from ethanol of (D) PTMSP, (E) PTMSP/PAF-1 and (F) PTMSP/p-DCX membranes.

EXAMPLES

Example 1—Polycondensation of Bis(chloromethyl) Monomers (dichloroxylene) to Synthesis pDCX To a solution of monomer in anhydrous dichloroethane (DCE, 10 mL), a DCE solution of FeCl3 was added under nitrogen. The resulting mixture was heated while stirring at 80° C. The resulting brown precipitate was washed once with water, three times with methanol (until the filtrate was clear), and with diethyl ether followed by drying for 24 h at 60° C. Suitable p-DCX hypercrosslinked polymer particles may be prepared by the method of Wood et al., *Chem. Mater.* 2007, 19, 2034-2048.

PTMSP is dissolved in solvents that may include chloroform, or tetrahydrofuran, or cyclohexane, followed by the dispersion of pDCX in this polymer solution. The mixture is allowed to stir for 12-24 hours to achieve a homogenous dispersion. This mixture is then casted on a glass petri dish, or Teflon petri dish, or porous substrate. Upon solvent evaporation, a polymer film forms, and is ready for characterisation. The pure gas permeabilities of the membrane are then tested using a simple time lag apparatus.

300 mg of PTMSP was mixed with 30 mg of hypercrosslinked resin (pDCX) in 10 mL CHCl$_3$. After mixing the solution was stirred for 24 hours, after which the insoluble pDCX was well dispersed throughout the solution. A membrane was cast in a Teflon dish (47 mm). The resulting membrane was homogeneous and the polymer was well dispersed throughout the PTMSP.

Permeability Measurement

Single gas permeability measurements. Pure H$_2$, N$_2$, CH$_4$, and CO$_2$ permeabilities were determined using a constant volume, variable pressure method and primarily used for characterizing polymer aging. Gas permeabilities at 2 atm and room temperature were determined from the rate of downstream pressure build-up rate (dp/dt) obtained when permeation reached a steady state according to the following equation:

$$P = D \times S = \frac{273 \times 10^{10}}{760} \frac{VL}{AT \left[\frac{p2 \times 76}{14.7}\right]} \left(\frac{dp}{dt}\right) \quad \text{Equation 1}$$

P refers to the permeability of a membrane to a gas and its unit is in Barrer (1 Barrer=1×10$^{-10}$ cm$^3$ (STP)-cm/cm$^2$ sec cmHg), D is the average effective diffusivity (cm$^2$/s), S is the apparent sorption coefficient/solubility (cm$^3$ (STP)/ cm$^3$ polymer cmHg), V is the volume of the downstream chamber (cm$^3$), L is the film thickness (cm). A refers to the effective area of the membrane (cm$^2$), T is the experimental temperature (K) and the pressure of the feed gas in the upstream chamber is given by p2 (psia).

Figure 1:
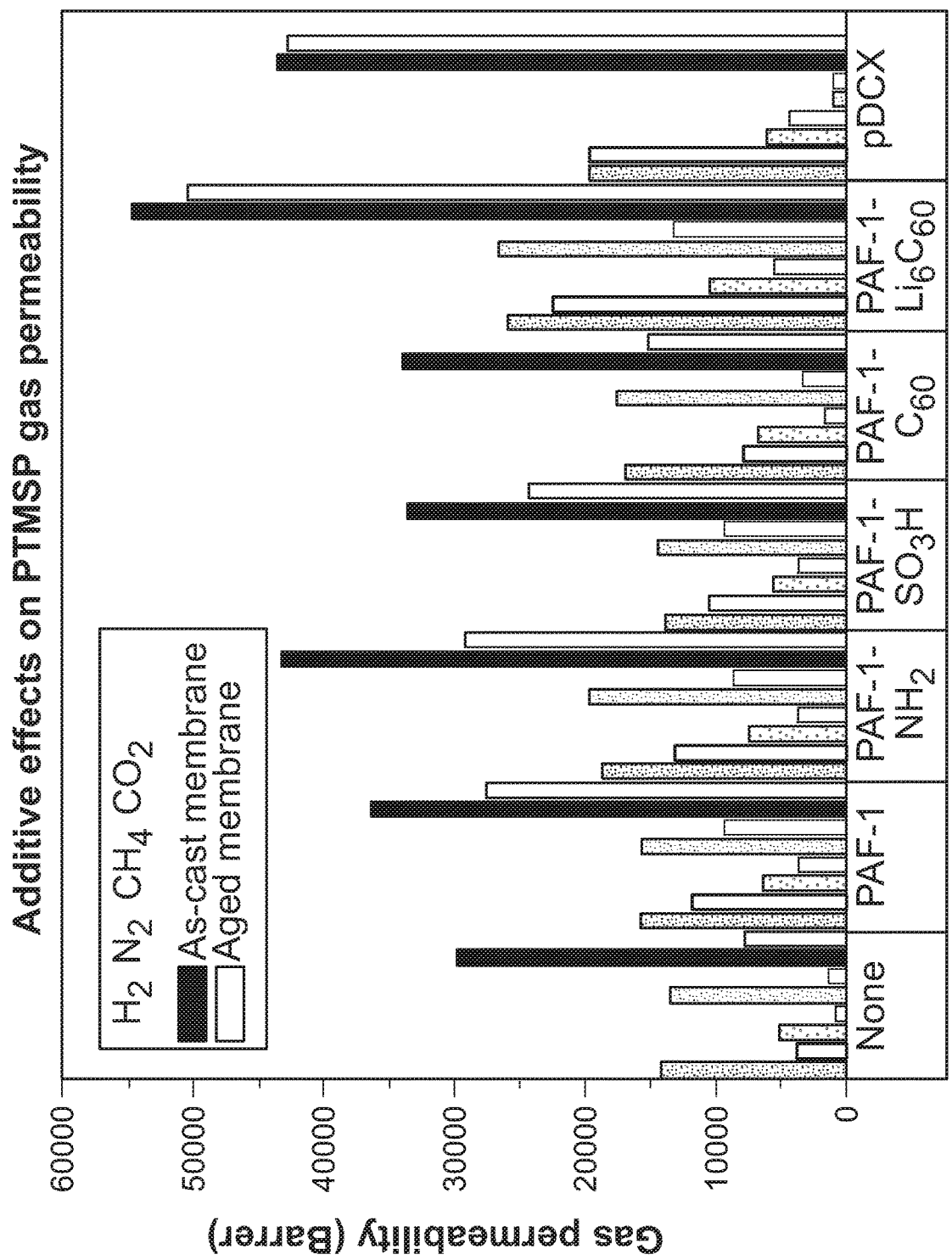
FIG. 1 is a column chart comparing the change in gas permeability with time (as a measure of ageing) of the matrix polymer alone and with different dispersed polymer particles including PAF-1 and a composition according to the invention comprising hypercrosslinked polymer particles.

A PTMSP solution containing 10 wt. % of pDCX (p-dichloroxylene hypercrosslinked polymer) particles in chloroform was cast on a Teflon-lined glass petri dish. A 20 µm film was formed over slow evaporation at 90° C. Subsequently, the free-standing films were thermally treated at 120° C. for 4 hours, 150° C. for 4 hours, and 200° C. under vacuum for 24 hours. These steps are required to fully evacuate the solvent from the films. The gas permeabilities of this nanocomposite are shown in FIG. 1.

System 1 (FIG. 1) shows the performance of PTMSP, as can be seen the membrane has high permeability to gases. However, the membrane ages quickly and after 365 days the permeability has decreased by 90%. Previous work by the team has shown that this aging can be dramatically reduced by including a porous aromatic framework (PAF, system 2) and a number of modified PAFs (systems 3-6). The PAF is also a nanoporous organic polymer, like the hypercrosslinked polymer used in this invention, however, the surface area of the PAF is higher. The limitation of the PAF is large scale synthesis and cost. Hypercrosslinked polymers can be synthesized on a large scale using inexpensive reagents. When pDCX was incorporated into a PTMSP membrane the resulting materials have increased permeability to hydrogen, nitrogen, and carbon dioxide. The results are in line with the best of the optimized PAF systems with only system 6 outperforming the pDCX in terms of permeability. System 6 used a PAF that contains a lithiated fullerene so the pDCX is easier to access. Initial aging studies (Table 1) have demonstrated the pDCX membrane maintains permeability to hydrogen and carbon dioxide which shows the same anti-aging effect for the PAFs.

TABLE 1

Initial Aging Results of PTMSP/p-DCX nanocomposite membranes (barrer units).

| Days of aging | H$_2$ | N$_2$ | CH$_4$ | CO$_2$ |
|---|---|---|---|---|
| 0 | 19673 | 6093 | | 43538 |
| 7 | 19564 | 4287 | | 42887 |
| 14 | 19336 | 4130 | | 42402 |
| 28 | | | | |

Example 2—Liquid Purification

This example describes preparation of membranes of the invention comprising a matrix of PTMSP and dispersed particles of p-DCX (referred to as PTMSP/p-DCX) and compares their performance in pervaporation with membranes of PTMSP membranes comprising dispersed particles of PAF-1 (PTMSP/PAF-1) and PTMSP without dispersed particles (PTMFP). In some instances comparison is also made with commercially available polymer membranes used in pervaporation.

S1. Chemicals and Materials

Analytical grade methanol (MeOH), ethanol (EtOH), isopropanol (IPA), cyclohexane (EMD Millipore Corporation), Poly-trimethyl-silylpropyne (PTMSP) was purchased from Gelest Inc. (Morrisville Pa., USA) and used without purification. Chloroform, dichloro-methane (DCM), and hydrochloric acid (HCl) were used as received. 1,4, dichloroxylene (DCX) 98%, Iron (III) chloride, reagent grade, anhydrous 97%, 1,2 Dichloroethane (DCE) was supplied by Chem-Supply.

S2. PAF-1 Synthesis

PAF-1 was synthesised according to Ben, T. et al. [Targeted Synthesis of a Porous Aromatic Framework with High Stability and Exceptionally High Surface Area. *Angew. Chem.* 121, 9621-9624, doi:10.1002/ange.200904637 (2009)] to yield an off-white powder with a BET surface area of 3760 m$^2$/g). 1,5-cyclooctadiene (dried over CaH$_2$) was added into a solution of bis(1,5-cyclooctadiene) nickel and 2,2'-bipyridyl in dehydrated DMF, and heated at 80° C. to form a purple solution. Tetrakis(4-bromophenyl)methane was added to the mixture and stirred overnight at 80° C. The mixture was allowed to cool to room temperature and concentrated HCl was added. The solids were collected and washed with chloroform, THF, and deionized water. The particle size was typically in the range of 100-200 nm.

S3. p-DCX Synthesis

To a solution of DCX monomer (0.171 mol, 30 g) in anhydrous DCE (388 mL), a DCE solution (388 mL) of FeCl$_3$ (0.173 mol, 28 g) was added. The resulting mixture was stirred in an open vessel at room temperature. The precipitated p-DCX was washed once with water, three times with methanol (until the filtrate was clear), and with diethyl ether followed by drying for 24 h at 60° C.

S4. Preparation of Membranes 2 wt. % PTMSP was dissolved in chloroform. The doping solution was poured into a polyfluortetraethylene (PTFE) dish. After the evaporation of chloroform, a 100 μm thick membrane for PV was obtained. For the p-DCX and PAF-1 incorporated membranes, 10 wt. % of nanoparticles (compared with PTMSP) was added in the doping solution before the formation of uniform PTMSP solution. After that, all of the procedures are same with the pristine PTMSP PV membranes. The thickness of the final membranes was determined by a digital micrometer.

S5. Pervaporation Experiments

Figure 2:
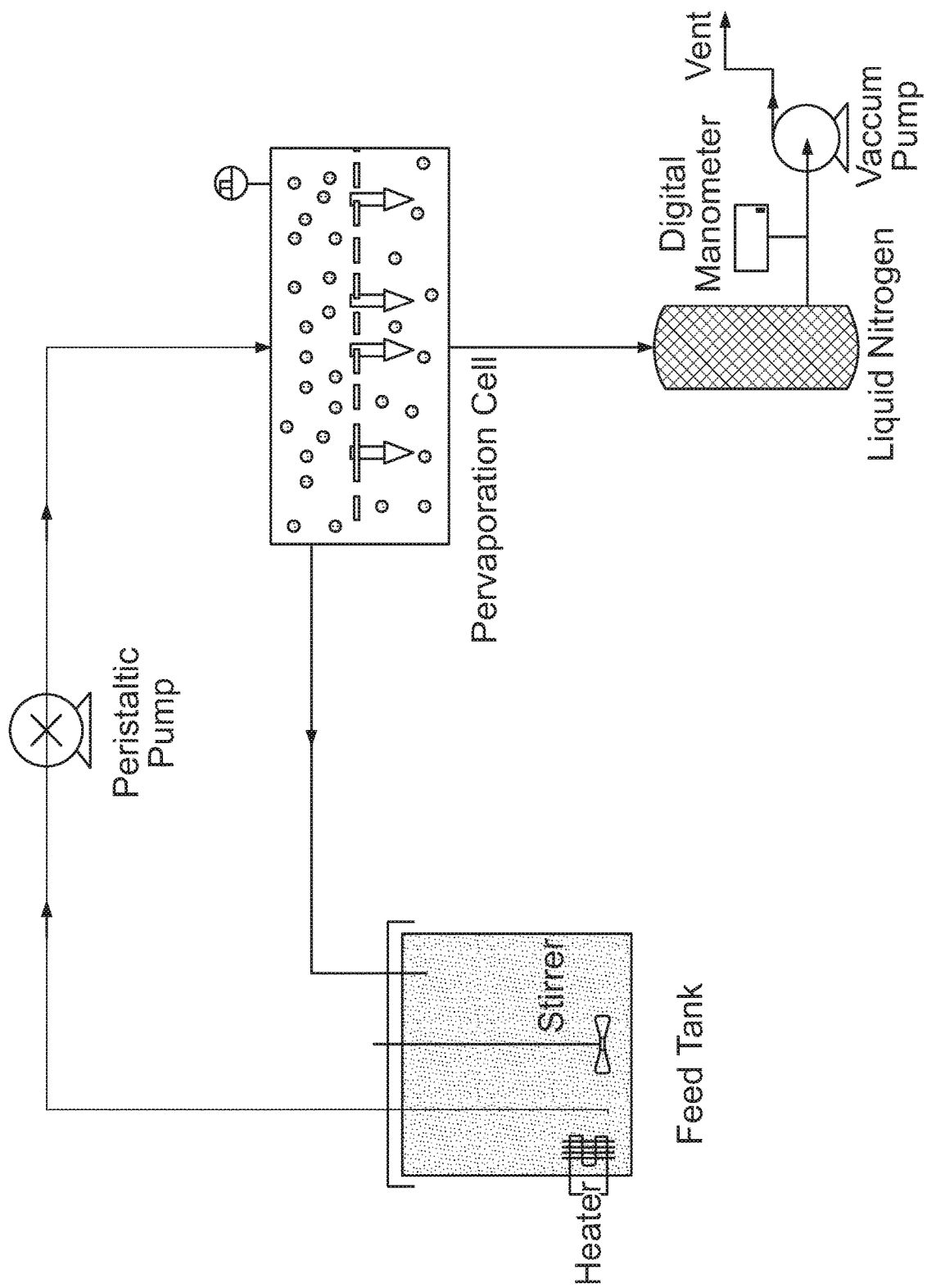
FIG. 2. The schematic of the pervaporation unit in this work.

For the bulk of PV membrane characterisation, experiments were performed on 100 μm thick unsupported PTMSP based membranes. Each PV run was conducted for 3 hours and each condition was repeated for 2-3 times. Total experimental time for unsupported PTMSP based membrane PV characterisation was 96 hours. Experiments performed on unsupported membranes were non-continuous i.e. there were start-up and shut-down periods between each run. The pervaporation experiments were carried out using a pervaporation unit with a heater, peristaltic pump, vacuum pump, as schematically shown in FIG. 2. The membrane was placed in the middle of a pervaporation cell and the effective surface area of the membrane was 12.57 cm$^2$. Different concentration aqueous ethanol solutions 3-10 wt. % ethanol were used as feed solution. During the experiment, the feed solution was preheated between 20 to 60° C. using a water bath and circulated through the membrane cell using a Maserflex® peristaltic pump. The permeate was collected using a liquid nitrogen cold trap. The vacuum at the permeate side of membranes was maintained at 5 and 15 Torr for unsupported and supported PTMSP based membranes, respectively.

Total flux (J) is calculated as $$J = \frac{W}{A}$$

where W is the weight of permeate collected, A is the effective membrane area, and t is the time that permeate was collected in the trap.

The process separation factor 3 is defined as $$\beta = \frac{Y_e/Y_w}{X_e/X_w}$$

where $X_e$ and $X_w$ are mole fraction of ethanol and water in the feed, respectively. $Y_e$ and $Y_w$ are mole fractions of ethanol and water in the permeate, respectively. Ethanol concentration is determined using NMR analysis a Bruker Av400 NMR spectrometer. 1H NMR spectra were recorded in dimethyl sulfoxide (DMSO)-D6.

FIG. 2 shows a schematic of the pervaporation unit in this work.

Figure 3A:
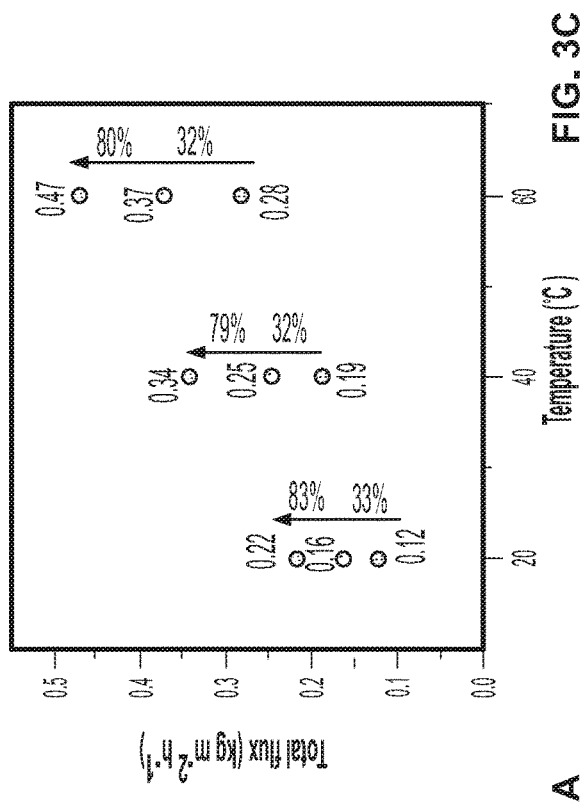
FIGS. 3A-D comprise a series of 4 charts showing the effects of (A) ethanol concentration (FIGS. 3A-B) and (B) temperature on the total flux and EtOH/water selectivity of membranes (FIGS. 3C-D). In each Chart the top dot relates to the PTMSP/p-DCX membrane; the middle dot relates to the PTMSP/PAF-1 membrane and the bottom dot relates to the PTMSP control membrane. The upper percentages show the percentage change in PTMSP/p-DCX for the PTMSP and the lower percentage is the change in the PTMSP/PAF-1 membrane from the PTMSP control.
Figure 3B:
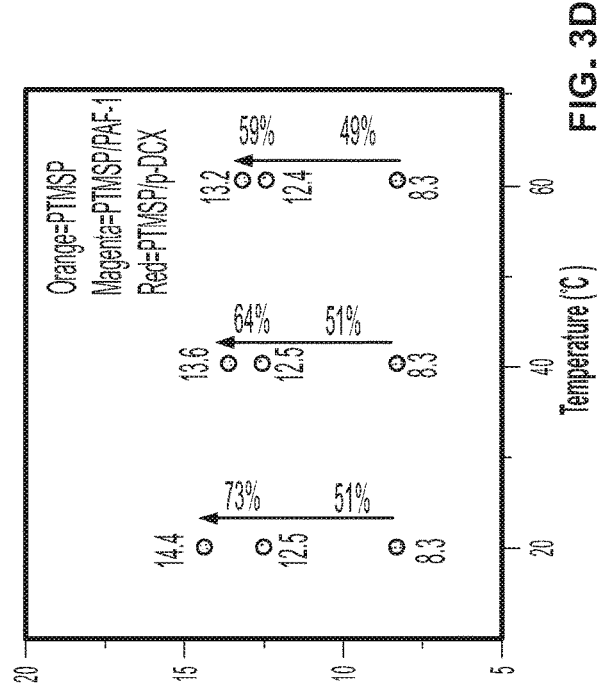
Figure 3C:
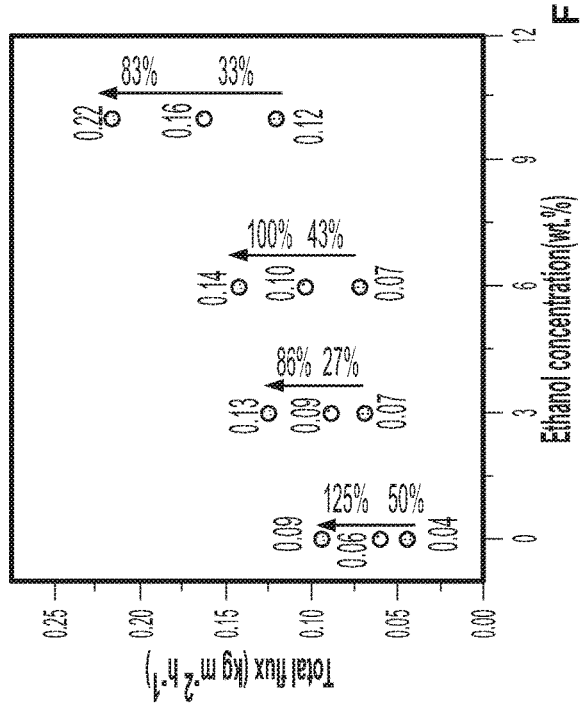
Figure 3D:
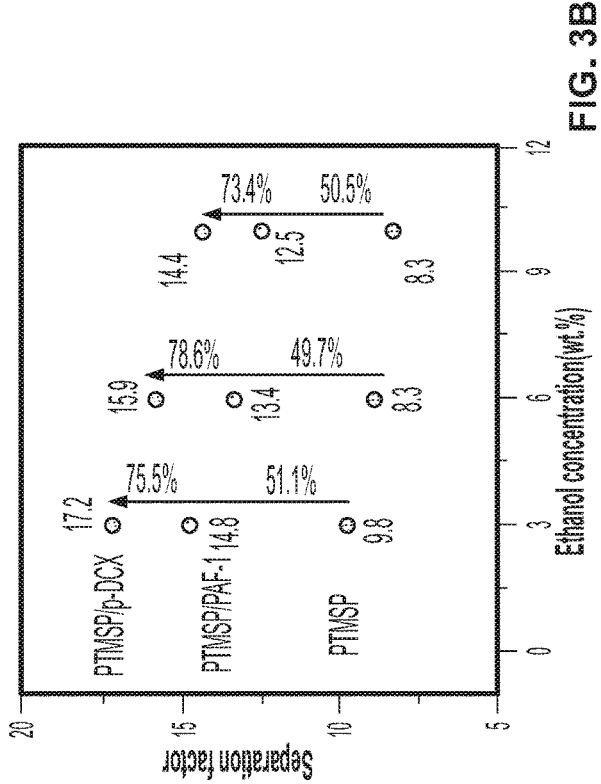

FIGS. 3A-D show the effects of (A) ethanol concentration (FIGS. 3A-B) and (B) temperature on the total flux and EtOH/water selectivity of membranes (FIGS. 3C-D).

Figure 4:
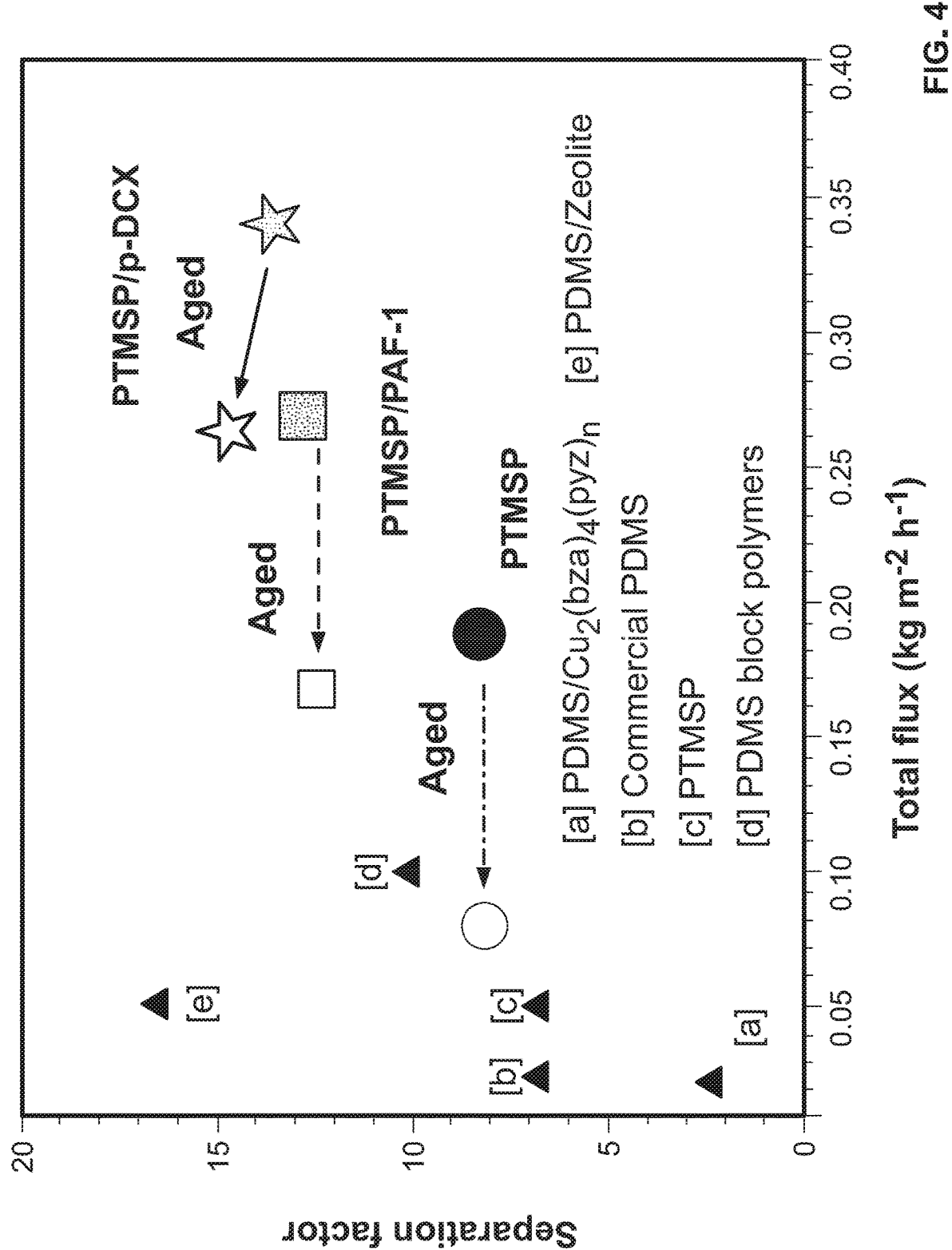
FIG. 4 is a graph providing a comparison of PV separation performances of the PTMSP membrane of the invention with other silicon based pervaporation membranes for EtOH/water separations.

FIG. 4 provides a comparison of PV separation performances of our membranes with other silicon based pervaporation membranes for EtOH/water separations; [a] and [e] are reported in reference J. A. González-Marcos, C. López-Dehesa, J. R. González-Velasco, *J. Appl. Polym. Sci.* 2004, 94, 1395-1403; [b] and [c] are reported in reference S. B. Teli, G. S. Gokavi, M. Sairam, T. M. Aminabhavi, *Sep. Purif. Technol.* 2007, 54, 178-186; and [d] is reported in reference N. Petzetakis, C. M. Doherty, A. W. Thornton, X. C. Chen, P. Cotanda, A. J. Hill, N. P. Balsara, *Nat Commun* 2015, 6.

PAF-1 and p-DCX additives were found to simultaneously enhanced both the total flux and EtOH/water selectivity of 100 μm thick PTMSP PV membranes. PV experiments were performed at 40° C., with upstream and downstream pressures of 760 and 5 Torr, over 96 hours of continuous operation. From solution NMR experiments, we observed that the EtOH/water selectivities of PTMSP membranes increased by 52% and 65% with the inclusion of PAF-1, and p-DCX, respectively. EtOH adsorption over water in PTMSP membranes was drastically enhanced by p-DCX and PAF-1, leading to the higher EtOH/water selectivities. More importantly, the enhanced PV performances of aged PTMSP/p-DCX were 50% higher than as-cast pure PTMSP membranes.

10 wt. % of PAF-1 and p-DCX enhanced the total (water and ethanol) fluxes of unsupported 100 μm thick PTMSP membranes by 31% and 79% respectively. The EtOH/water selectivities were increased by 52% and 64%). More importantly, the anti-aging effects of PAF-1 and p-DCX nanoparticles on PTMSP gas separation membranes were also observed here when the same membranes were deployed for continuous PV operations. PTMSP PV membranes studied here lost 51% of the total flux in nearly 100 hours of continuous operation, while the total fluxes of PTMSP/PAF-1 and PTMSP/p-DCX PV membranes were only reduced by 34% and 25%, respectively. The total flux of aged PTMSP/p-DCX membranes remained 30% higher than that of as-cast PTMSP membranes; indicating the applicability of these membranes for long term PV operation in the industry. Upon physical aging, the EtOH/water selectivity of PTMSP/p-DCX membranes increased by 10% while the selectivities of PTMSP and PTMSP/PAF-1 membranes remained the same. The simultaneous enhancements in total flux and EtOH/water selectivity of both PTMSP/PAF-1 and PTMSP/p-DCX membranes are atypical of most other PTMSP/additive membranes. Most PTMSP/additive membranes display a trade-off relationship between total flux and selectivity (similar to that described by Robeson's plots for pure gas permeability), where increments in total flux are reflected by a decrease or no changes in molecular selectivity, and vice versa. However low contents of high molecular weight polymer particles increased both the flux and EtOH/water selectivity of PTMSP PV membranes, but aging data of such membranes were not reported. The high porosities of hydrophobic PAF-1 and p-DCX nanoparticles provided additional channels for molecular diffusion, thus improving the total flux of our PTMSP/additive membranes. Meanwhile the exceptional surface areas of these hydrophobic particulate additives provide more adsorption sites that favoured alcohol adsorption over water; thus improving the EtOH/water selectivity. The combination of enhanced molecular adsorption and additional porosity for molecular diffusion accounted for drasticenhancements in both total flux and EtOH/water selectivity.

p-DCX nanoparticles reduced the impact of physical aging on solvent flux losses. Through intimate non-bonding interactions with PTMSP chains, the mobilities of these polymer chains were drastically reduced, hence minimizing losses in free volume size and content. Non-compatible additives create nanogaps (as wide as 8 Å) between additives and polymer chains that reduced EtOH/water selectivity by allowing both water (2.8 Å) and EtOH (4.5 Å) molecules to permeate across membranes. However, from PALS analysis, it was clear that such nanogaps were absent in free-standing 1 μm thin PTMSP/p-DCX films. Coupled with a negligible reduction in pore sizes (~0.8 Å). The absence of nanogaps in PTMSP/PAF-1 membranes accounted for the unchanged EtOH/water selectivity over time. The unchanged EtOH/water selectivity in aged PTMSP/PAF-1 membranes implied that the permeation of EtOH and water across these membranes were uniformly reduced by physical aging. Interestingly, the EtOH/water selectivity of aged PTMSP/p-DCX membranes increased by nearly 10%. Upon physical aging in PTMSP/p-DCX films, the concentration of smaller pores (5.8 Å) increased from 4.2 to 5.1% (within ±0.3% error), while the concentration of the larger pores (14 Å) were reduced by 2%. The total flux of aged PTMSP/p-DCX membranes remained higher than any membranes studied because of higher solvent solubility coefficients. The reduced pore size distributions contributed to the increase in EtOH/water selectivity of aged PTMSP/p-DCX membranes.

Figure 5A:
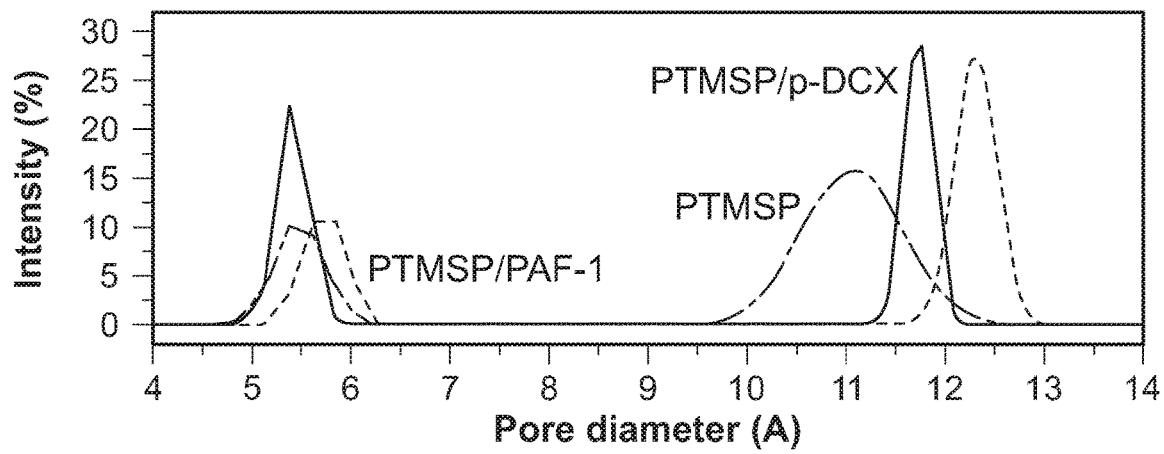
FIGS. 5A-C are a series of graphs showing (A) the intensity of various pore sizes for PTMSP/PAF-1; PTMSP; and the PTMSP/p-DCX membrane of the invention (b) the relative loss in percent of the membranes and (C) the ethanol uptake of the aged membranes.
Figure 5B:
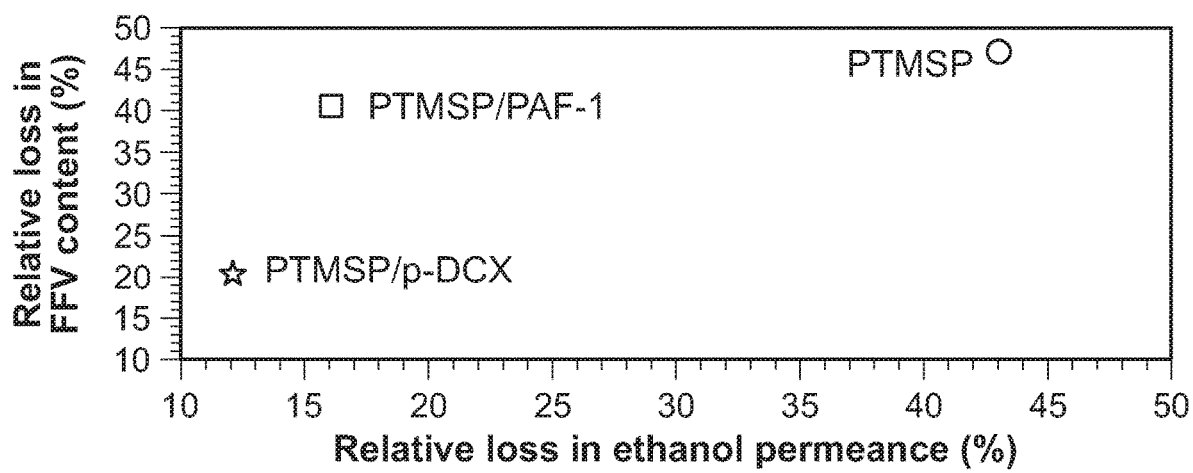
Figure 5C:
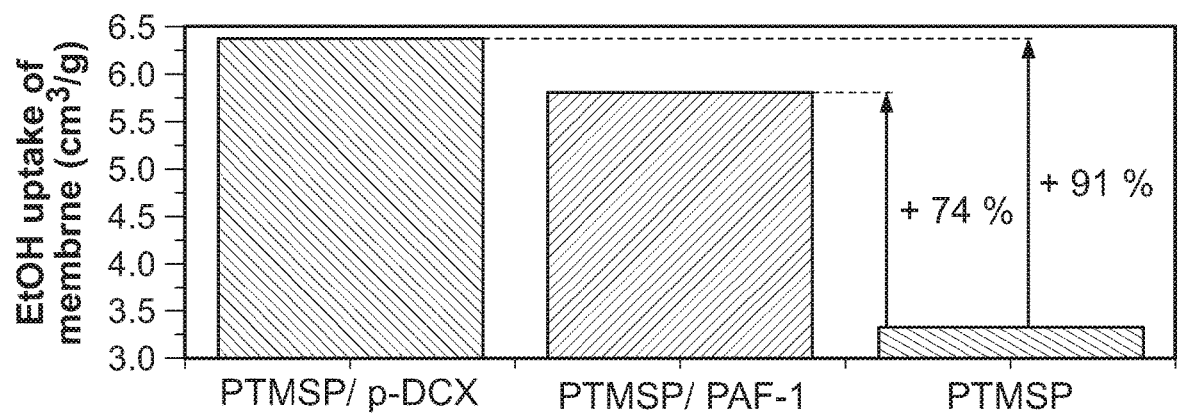

FIGS. 5A-C include figures which show Pore sizes and concentration of 100 μm thick as-cast (solid) and aged (dash) (A) PTMSP, (B) PTMSP/PAF-1, and (C) PTMSP/p-DCX films.

In conclusion, the total flux of our aged PTMSP/p-DCX membranes remained superior to as-cast pristine PTMSP, polydimethylsiloxane (PDMS) mixed matrix membranes, commercial pervaporation membranes, and current-state-of-the-art PDMS membrane. The main concern of deteriorating solvent flux to extremely low values, especially in thin films of PTMSP over time is resolved through the intimate interactions between p-DCX nanoparticles and PTMSP. The performance of the PTMSP/p-DCX membranes.

S6. Nitrogen Adsorption Isotherms

Gas adsorption isotherms between the range of 0-700 mmHg were measured by a volumetric approach using a Micrometrics ASAP 2420 instrument. All the samples were transferred to pre-dried analysis tubes, sealed with Transeal stoppers, evacuated and activated at 120° C. under a $10^{-6}$ dynamic vacuum for 24 hours. Ultra-high purity $N_2$ gases were used for these experiments. $N_2$ adsorption measurements were conducted at 77 K.

Figure 6:
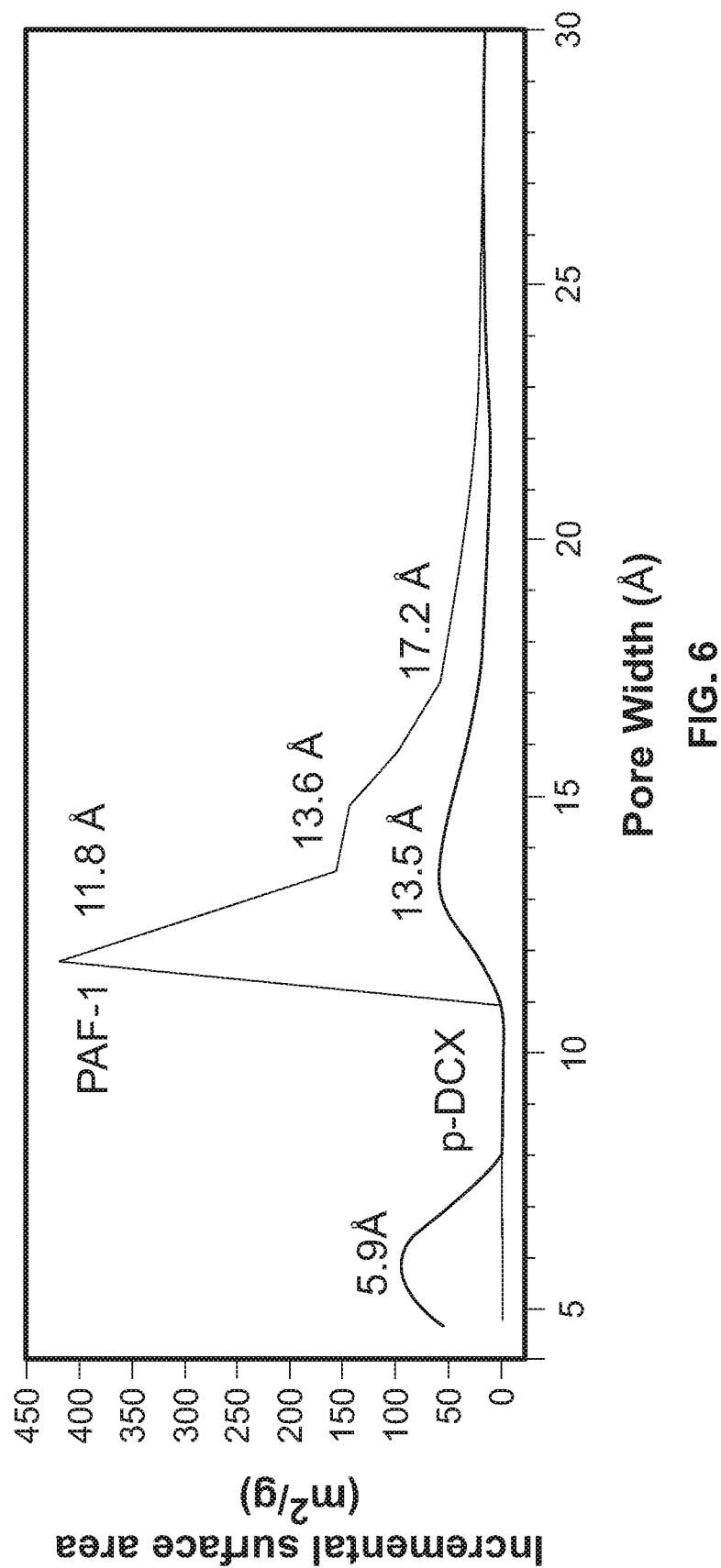
FIG. 6 is a graph showing the pore size distribution of PAF-1 (blue) and p-DCX (red) nanoparticles obtained from nitrogen adsorption isotherms performed at 77 K.

FIG. 6 is a graph showing the pore size distribution of PAF-1 (blue) and p-DCX (red) nanoparticles obtained from nitrogen adsorption isotherms performed at 77 K.

S7. Positron Annihilation Lifetime Spectroscopy (PALS)

Bulk PALS experiments that were used to characterize aging in the material bulk were performed at CSIRO using an EG&G Ortec fast-fast coincidence system with fast plastic scintillators and a resolution function of 260 ps FWHM ($^{60}$Co source with the energy windows set to $^{22}$Na events). Due to the long lifetimes, and the low counting rate, the coincidence unit was removed and the range of the TAC extended to 200 ns. The film samples were stacked to a thickness of 2 mm, and powdered samples were packed (>1.5 mm depth), on either side of a 30 μCi $^{22}$NaCl source sealed in a 2.54 μm thick Mylar envelope (source correction 1.605 ns and 2.969%) and measured at $5 \times 10^{-7}$ Torr. At least five spectra of 4.5 million integrated counts were collected with each spectrum taking about 4.6 h to collect. Data analysis was performed using LT9. The spectra were best fitted with five components with the shortest lifetime fixed to 125 ps, characteristic of p-Ps annihilation. For the long lifetimes obtained, the Tao-Eldrup model[2,3] traditionally used for calculating mean pore sizes from mean o-Ps lifetimes is not valid; therefore, the mean free path (nm) of the pores was calculated using the Rectangular Tao Eldrup (RTE) model.

S8. Membrane Characterisation

The cross-section and surface morphologies of the cryo-fractured membranes were characterised by FESEM (MERLIN Compact, Zeiss Company). A contact angle measuring system (G10 Kruss, Germany) was used to measure the static water contact angle of membranes. A deionized water droplet was placed on a dry flat membrane surface and the contact angle was obtained. The reported contact angle value was calculated by averaging over more than five contact angle values at different sites and are shown in Table 2.

TABLE 2

Contact angles of PTMSP and PTMSP/PAF-1 membranes.

| Sample Name | Water Contact Angle (°) |
|---|---|
| PTMSP | 117 |
| PTMSP/PAF-1 | 127 |
| PTMSP/p-DCX | 122 |

Example 3—Alcohol Purification

This Example compares the performance of PTMFP/p-DCX membranes of the invention with corresponding PTMFP/PAF-1 membranes not of the invention and a cotrol membrane of PTMFP containing no dispersed particles as well as some commercially available membranes.

Organic solvent nanofiltration (OSN) membranes are characterized by their nominal molecular weight cut-off for a reference compound where small molecules such as pharmaceuticals, and dyes are removed from organic liquids. The permeance enhancements in polymer membranes loaded with the hypercrosslinked porous particles was accompanied by higher alcohol selectivities over solutes such as dyes (which were used as a proxy for pharmaceutics), overcoming the trade-off relationship between permeance and selectivity. The separation performance of the membranes was found outperform commercially available polymer membranes. These membranes are optimal for transforming batch processes like alcohol purification into continuous operations; streamlining current industrial practices.

Polymer physical aging is a process where the convergence of glassy polymer chains collapses the inter-chain free volume, also known as fractional free volume (FFV) content, required for molecular transport via diffusion and adsorption. Other than physical aging, separation performances of ultrathin polymer membranes can also deteriorate due to membrane compaction, where high pressures compress polymer chains and collapse molecular transportation pathways. In a commercial setting, membranes on polymeric substrates are generally allowed to age and compact to achieve steady-state permeance for continuous operation. This approach sacrifices the initial tantalising membrane performance for stability.

S1. Chemicals and Materials

Analytical grade methanol, ethanol, isopropanol, Rose Bengal (RB), Crystal Violet (CV), and Thiazole Yellow (TY) (Sigma-Aldrich) were purchased and used without further purification. PTMSP was purchased from Gelest Inc (SSP070-10GM, Lot 41-23599, Mw 210 kDa, 95% purity) and used without purification. Chloroform, dichloromethane (DCM), and hydrochloric acid (HCl) were used as received. 1,4, dichloroxylene (DCX) 98%, Iron (III) chloride, reagent grade, anhydrous 97%, Tetraphenylmethane, bis(1,5-cyclooctadiene) nickel, and 2,2'-bipyridyl were purchased from Sigma Aldrich, and used without further purification. 1,2 Dichloroethane (DCE) was supplied by Chem-Supply.

S2. PAF-1 and p-DCX Synthesis

PAF-1 and p-DCX were prepared as describe in Example 2 (S2 and S3)

S4. Preparation of Membranes

The polymer dope solution was prepared by dissolving 2 wt. % of PTMSP (Gelest Inc.) in cyclohexane. 10 wt. % (with respect to PTMSP concentration) of porous additives, PAF-1 or p-DCX, were added to the polymer dope solution and stirred for 24 hours. This mixture was then poured onto a glass plate. Doctor blades with thickness 30, 50, 80, 100, 150 um were used to knife-cast thin membranes. Upon solvent evaporation, the glass plate with a thin layer of membrane was lowered into a water bath. This enabled the flotation of the thin polymer membrane film onto the surface of the water. A polycarbonate porous substrate was lowered into the water bath, and came into contact with the PTMSP-based membrane. Water was then drained out, and a free-standing PTMSP-based membrane supported on a polycarbonate substrate was obtained.

S5. Scanning Electron Microscopy (SEM)

All membrane films were cryo-fractured, to achieve a clean break, and then mounted on cross-section SEM sample stubs. These sample stubs were then coated with iridium for elemental analysis through energy dispersive spectroscopy (EDS) during imaging.

TABLE 3

FFV content of free-standing as-cast, aged and wet (EtOH soaked) PTMSP, PTMSP/PAF-1, and PTMSP/p-DCX membranes.

| Sample Name | Aged FFV (%) dry | Aged FFV (%) wet |
|---|---|---|
| PTMSP | 20 | 11 |
| PTMSP/PAF-1 | 21 | 14 |
| PTMSP/p-DCX | 30 | 12 |

S8. Organic Solvent Nanofiltration Experiments

The permeances or fluxes of OSN membranes were measured using a self-made, stainless steel dead-end pressure cell with a membrane area of 21.2 cm$^2$. The feed solution was pressurised with nitrogen to 5 bar at room temperature. During filtration, the feed solution was stirred at 11.66 Hz (700 rpm) to avoid concentration polarization. Permeate samples were collected in cooled flasks as a function of time, weighed and analysed. The solvent flux and solvent permeance were calculated using the following equations:

$$F = \frac{V}{A \times t} \quad (1)$$

$$\text{Permeance} = \frac{F}{\Delta P} \quad (2)$$

where F represents the solvent flux (L m$^{-2}$ h$^{-1}$), V (L) is the volume of the solvent (or solution) passing through the membrane, A is the effective membrane area (m$^2$), t is the operation time (h); and $\Delta P$ is trans-membrane pressure (bar). Solvent permeances were tested in the order of MeOH>EtOH>i-PrOH.

The solute rejections of NF membranes were calculated using Eq.3

$$R = \left(1 - \frac{C_p}{C_f}\right) \cdot 100\% \quad (3)$$

where $C_p$ and $C_f$ are the solute concentrations in the permeate and the feed solution, respectively. Dye concentrations in IPA were measured with a UV-VIS CINTRA20-GBC apparatus ($\lambda_{max}$ of RB=548 nm). Each data point is an average of three repetitions of each test, with ±5% standard deviation.

FIGS. 7A-F include figures which show the methanol (black), ethanol (red) and isopropanol (blue) permeances of as-cast (solid) and aged (empty) 1 um thin (A) PTMSP, (B) PTMSP/PAF-1 and (C) PTMSP/p-DCX membranes supported on polycarbonate substrates. The Rose Bengal (orange), Thiazole Yellow (green), and Safranine O (purple) dyes rejection rates from ethanol of (D) PTMSP, (E) PTMSP/PAF-1 and (F) PTMSP/p-DCX membranes.

PTMSP membranes (1 μm thin) comprising PAF-1 and p-DCX nanoparticles supported on porous polycarbonate substrates were prepared for for OSN, and voided the need to sacrifice initial membrane performances for stability (FIG. 1). These membranes were used to recover alcohol from dye mixtures, mimicking industrial pharmaceutical recovery from alcohol. PAF-1 and p-DCX drastically enhanced the alcohol permeances of OSN membranes by 90%; whilst improving dye rejections. PAF-1 and p-DCX also prevented compaction impact on these OSN membranes. Continuous long term membrane operation in OSN conditions (5 bar, 25° C., stirring speed of 700 rpm) revealed a drastic lowering in physical aging in 1 μm thin membrane films when the additives were incorporated. More importantly, p-DCX additives stabilised the drastically enhanced alcohol permeances of PTMSP mixed matrix membranes. Overall the membranes are 'locked' in their initial state which allows effective use of the polymer membranes for high speed alcohol purification at low operating pressures.

The incorporation of PAF-1 and p-DCX into PTMSP drastically enhanced ethanol permeation by 42% and 90%, respectively; whilst improving dye rejection.

Figure 8B:
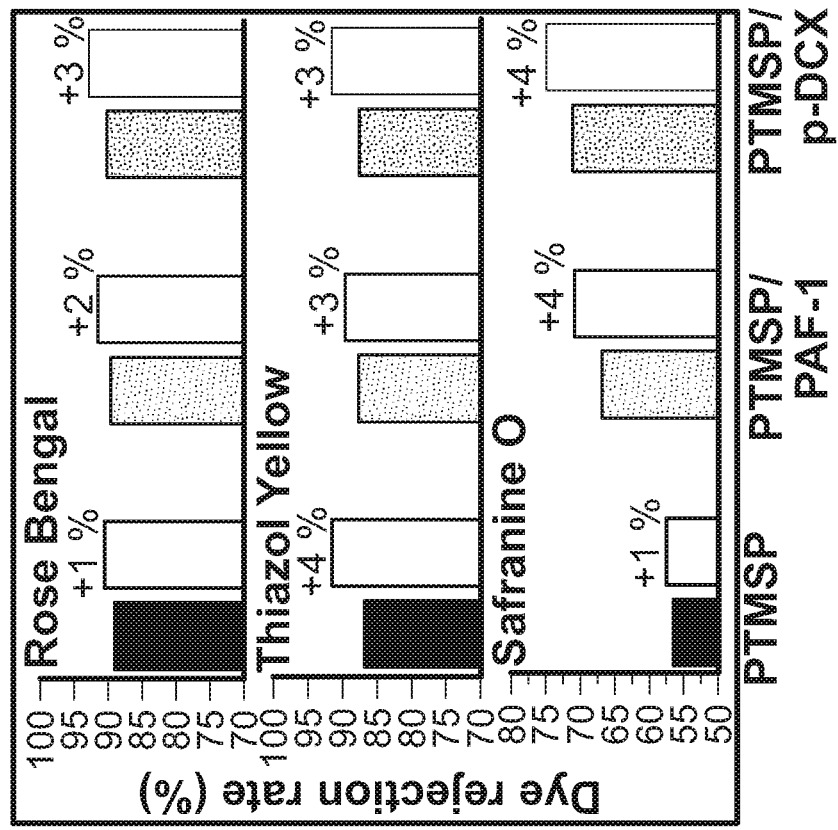
FIGS. 8A-B are 2 graphs showing: (A) the effects of physical aging (after 500 hours of continuous operation at 5 bar of solvent pressure and 25° C.) on ethanol transport in PTMSP (black), PTMSP/PAF-1 (blue), and PTMSP/p-DCX (red) where membranes were cast using 0.5 wt. % of doping concentration; and (B) dye rejection rates of as-cast (solid) and aged (empty) membranes studied here.
Figure 8A:
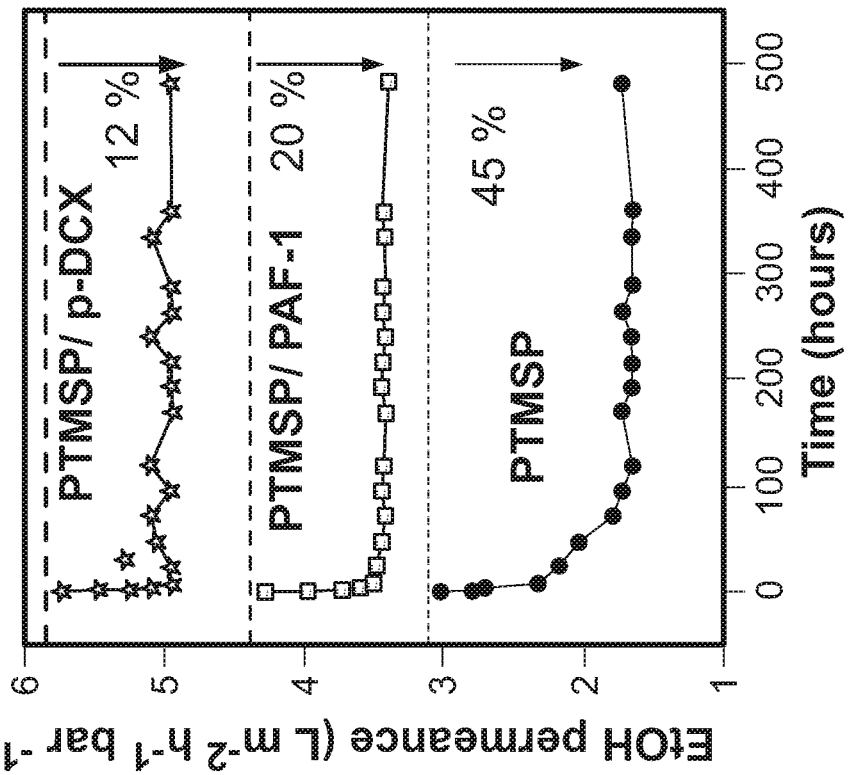

FIGS. 8A-B are 2 graphs showing: (A) the effects of physical aging (after 500 hours of continuous operation at 5 bar of solvent pressure and 25° C.) on ethanol transport in PTMSP (black), PTMSP/PAF-1 (blue), and PTMSP/p-DCX (red) where membranes were cast using 0.5 wt. % of doping concentration; and (B) dye rejection rates of as-cast (solid) and aged (empty) membranes studied here. The molecular weights of Rose Bengal, Thiazol Yellow, and Safranine O are 1017.64 g mol−1, 695.74 g mol−1, and 350.13 g mol−1, respectively.

The increment in EtOH permeance was attributed to the intrinsic pores of PAF-1 and p-DCX nanoparticles that provided additional molecular transportation pathways, the hydrophobicity of additives, and pore size enlargements in PTMSP membranes. Highly hydrophobic 5 Å pores in PAF-1 nanoparticles optimize alcohol diffusion. There are two pore size distributions centered at 5.9 Å and 13.5 Å in p-DCX nanoparticles, while there are three overlapping pore size distributions in PAF-1 in the region between 11.8 to 17.2 Å. The pore size distribution centered at 5.9 Å in p-DCX is optimal for alcohol diffusion; hence contributing to the 90% enhancement in EtOH permeance. The smaller pores of p-DCX nanoparticles also accounted for the 15% improvement in rejecting Safranine O, the smallest dye studied here (Mw 350.13 g mol$^{-1}$). PAF-1 and p-DCX nanoparticles slightly improved the 90% rejection rate of PTMSP membranes for both the larger Rose Bengal (Mw 1017.64 g mol$^{-1}$) and Thiazol Yellow (Mw 695.74 g mol$^{-1}$) dyes.

Unlike other mixed matrix membranes, the incorporation of porous nanoparticles did not reduce dye rejection rates; indicating an absence of large nanogaps between the porous additives and polymer chains. The dye rejection rates of present PTMSP/additive membranes are comparable to commercial membranes.

Physical aging was investigated using OSN membranes operated continuously for 500 hours at 5 bar. A lower operating pressure was chosen here to demonstrate that our ultrapermeable membranes can achieve alcohol permeances that are higher than commercial membranes without a large driving force. The EtOH permeance in PTMSP control membranes was reduced by 45%, and stabilized within the first 100 hours of aging. Physical aging reduced the pore sizes and concentration in PTMSP, hence impeding ethanol transport in aged PTMSP membranes. PAF-1 and p-DCX inhibited or abated the shrinkage and loss of such pores in anti-aging, and selective-aging gas separation PTMSP membranes. Here we report that this was also valid for alcohol transport across 1 μm thin PTMSP membranes. The enhanced EtOH permeances of PTMSP membranes loaded with PAF-1 and p-DCX were only reduced by 20 and 12%, respectively, and stabilized within 13 hours of testing. The anti-aging effect is more pronounced with p-DCX nanoparticles. Different from gas separation membranes where only the permeation of large molecules like nitrogen (kinetic diameter 3.64 Å) were affected by physical aging, we observed that the permeation of even larger molecules like ethanol (kinetic diameter 4.5 Å), and i-PrOH (kinetic diameter 4.7 Å) were not affected in our PTMSP/additive OSN membranes. Clearly, there is a different anti-aging mechanism for OSN.

Figure 9A:
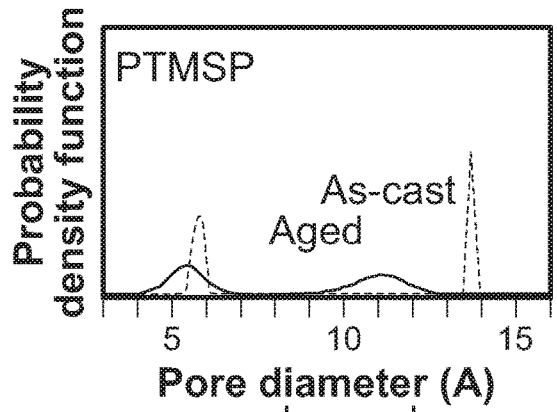
FIGS. 9A-H include three graphs showing the bimodal pore size distribution of (A) as-cast vs aged, PTMSP, PTMSP/PAF-1 and PTMSP/p-DCX membrane of the invention; (B) aged wet vs aged dry PTMSP, PTMSP/PAF-1, and PTMSP/p-DCX membranes determined using PALS; (C) The relationship between relative EtOH permeances of PTMSP, PTMSP/PAF-1 and PTMSP/p-DCX membranes and FFV content losses due to physical aging; and D the influence of additives on the EtOH adsorption in PTMSP, PTMSP/PAF-1 and PTMSP/p-DCX membrane.
Figure 9B:
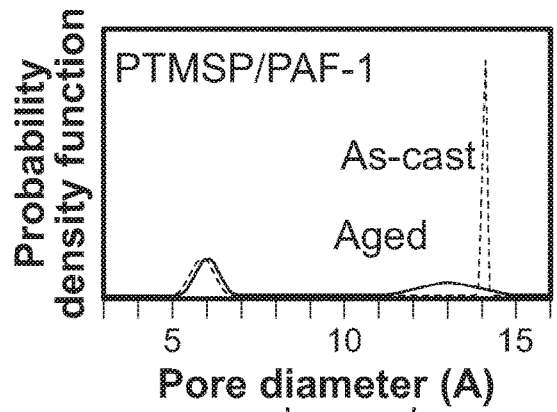
Figure 9C:
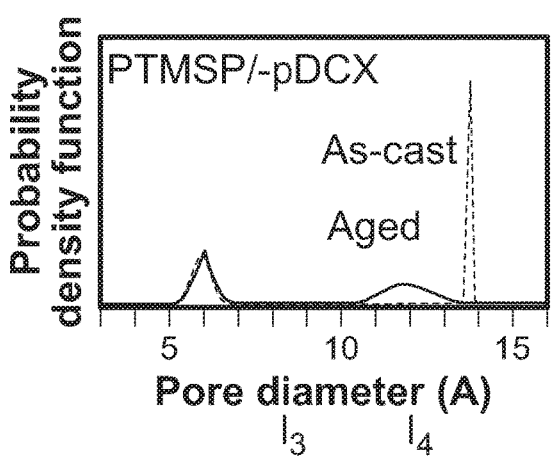
Figure 9D:
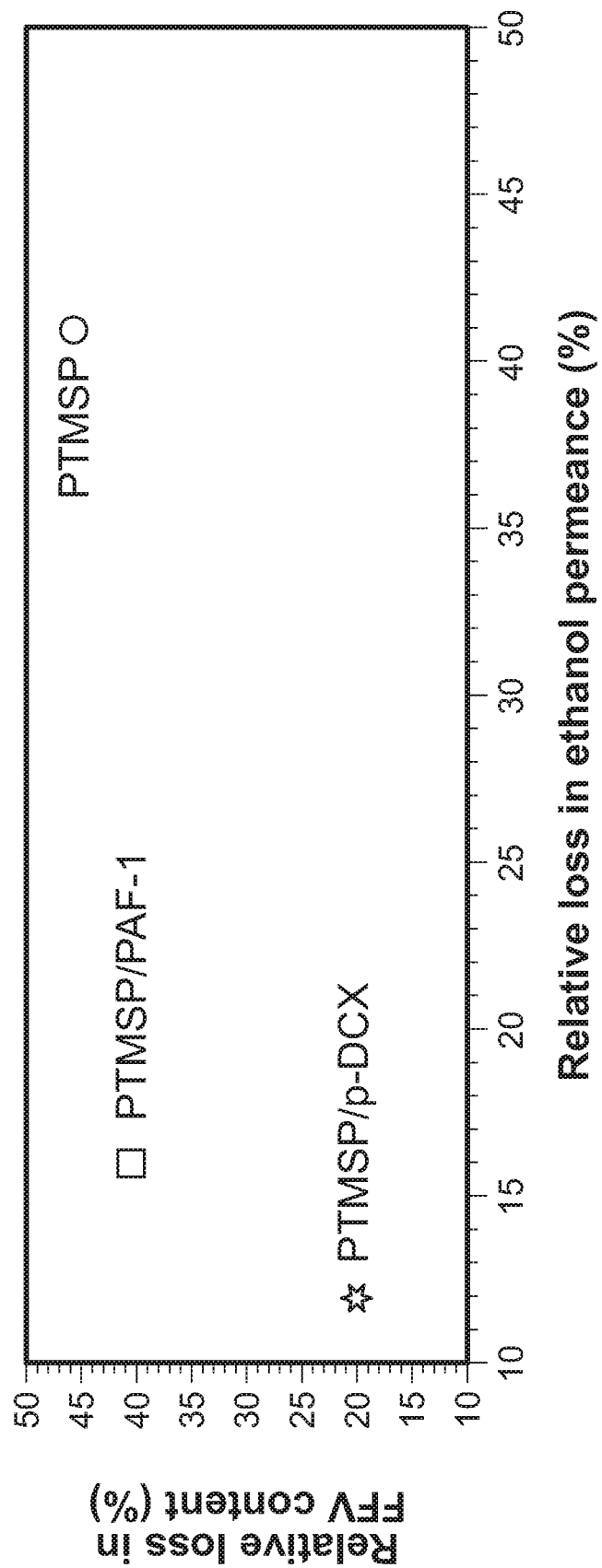

Positron annihilation lifetime spectroscopy (PALS) was used to track changes in pore size and concentration, and FFV content within 1 μm thin free-standing PTMSP-based films in the wet (pre-soaked in EtOH) and dry states. There is a bimodal pore size distribution centred at 5.5 Å ($d_3$) and 11 Å ($d_4$) in PTMSP (FIGS. 9A-C). Physical aging reduced the $d_3$ and $d_4$ pore sizes in PTMSP by 0.5 and 2 Å, respectively. The incorporation of PAF-1 and p-DCX nanoparticles did not alter pore sizes and concentration in as-cast PTMSP, indicating the good compatibility between PTMSP and our porous additives. With PAF-1 and p-DCX, the $d_4$ pores in aged PTMSP films were only reduced by 1 Å, while the $d_3$ pore size and the $d_3$ and $d_4$ pore concentrations remain unchanged. Aged 1 μm thin PTMSP, PTMSP/PAF-1, PTMSP/p-DCX membranes lost 48, 40, and 20% of FFV content (FIG. 9D). Higher FFV content i.e. porosity in aged PTMSP/additive membranes lowered transmembrane resistance and enhanced total flux. The relative losses in FFV content were smaller than relative losses in EtOH permeances in aged PTMSP/additive membranes. The impact of lost FFV content on EtOH transport could be mitigated by alcohol adsorption. This view is reinforced by the fact that PTMSP/PAF-1 membranes with higher FFV content had lower EtOH permeances when compared to PTMSP/p-DCX membranes with lower FFV content.

Figure 9E:
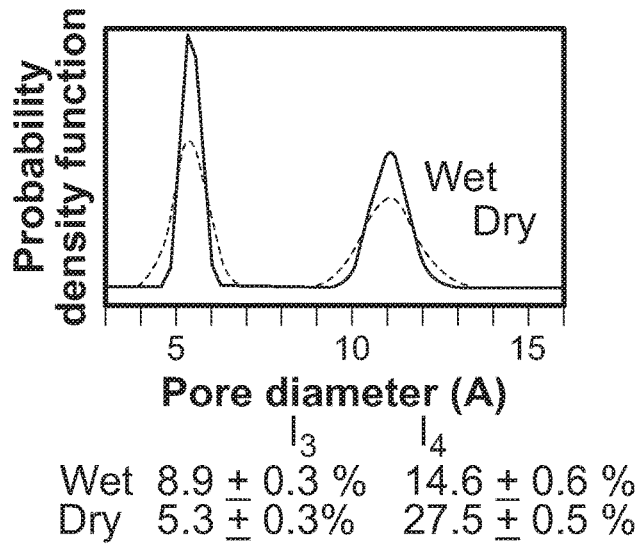
Figure 9F:
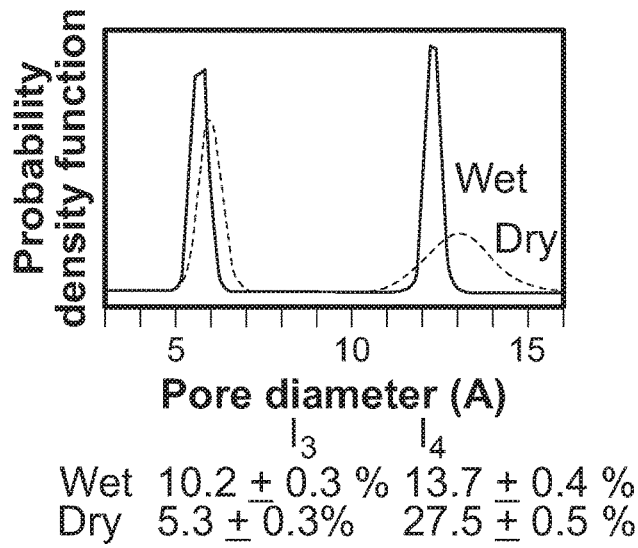
Figure 9G:
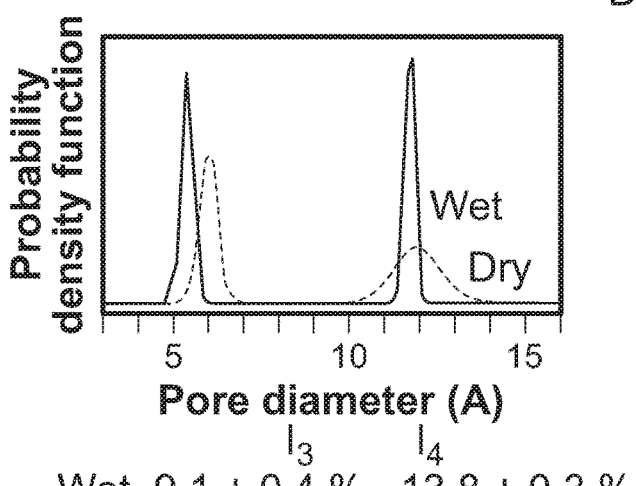
Figure 9H:
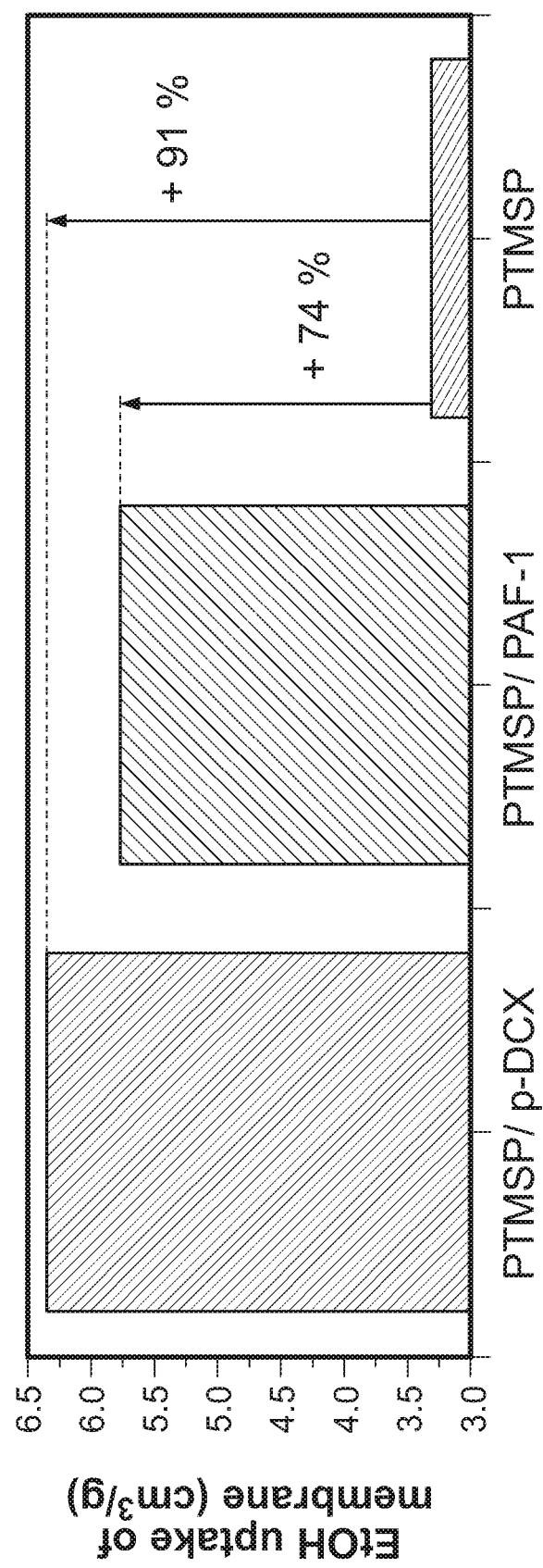

We also observed changes in pore sizes and concentrations in aged dry and wet (soaked in EtOH) PTMSP-based films (FIGS. 9E-G). Polymer films were soaked in EtOH for 24 hours, dried with tissue paper, prior characterisation. In the presence of EtOH, the pore sizes in aged PTMSP remained the same, while the concentration of $d_3$ and $d_4$ pores increased and decreased, respectively. This indicated that $d_4$ pores were filled up with EtOH molecules. The filling of pores with EtOH molecules was also observed across both $d_3$ and $d_4$ pores in both aged PTMSP/PAF-1 and PTMSP/p-DCX membranes. The filling of $d_3$ pores in PTMSP/additive films could be attributed to film hydrophobicity. PAF-1 and p-DCX nanoparticles increased the hydrophobicity of PTMSP films, that improved alcohol adsorption. This accounted for the highest EtOH adsorption of 6.4 cm$^3$/g in PTMSP/p-DCX membranes, 17% higher than PAF-1 loaded membranes (FIG. 9H). Higher EtOH adsorption did not swell PTMSP/additive membranes, but filled up the pores present in these membranes. The lack of swelling due to EtOH adsorption in our PTMSP/additive membranes indicated that the rigidification of PTMSP polymer chains by porous nanoparticles. This was further demonstrated through alcohol regeneration and membrane compaction tests.

FIGS. 9A-H include figures which show the bimodal pore size distribution of (A) as-cast vs aged (FIGS. 9A-9C), and (B) aged wet vs aged dry PTMSP, PTMSP/PAF-1(FIG. 9D), and PTMSP/p-DCX membranes determined using PALS. The pore size distribution is expressed as a probability density function. The pore concentration is expressed as intensity %. (C) The relationship between relative EtOH permeances of PTMSP, PTMSP/PAF-1 and PTMSP/p-DCX membranes and FFV content losses due to physical aging. (FIGS. 9E-G). (D) The influence of additives on the EtOH adsorption in PTMSP membranes studied here (FIG. 9H).

Alcohol regeneration is used to rejuvenate the collapsed FFV content between mobile polymer chains. Here we used this technique to reveal the rigidification of PTMSP chains by PAF-1 and p-DCX nanoparticles. Membranes were first exposed to 5 bar EtOH for 100 hours, and regenerated by a 100 hour EtOH soak. EtOH permeance in PTMSP membranes was reduced by 45% after 100 hours of physical aging. Alcohol regeneration of aged PTMSP membranes recovered 12% of EtOH permeances, while minimizing recovery impact on PTMSP/PAF-1 and PTMSP/p-DCX membranes. Even without alcohol regeneration, the EtOH permeances of PTMSP/PAF-1 and PTMSP/p-DCX membranes remained stable, and significantly higher than regenerated PTMSP. Without PAF-1 or p-DCX nanoparticles, PTMSP chains possessed more freedom and mobility. Through alcohol regeneration, alcohol molecules occupied and recovered the free spaces between these mobile polymers chains. As PTMSP chains were immobilized by PAF-1 or p-DCX nanoparticles, alcohol regeneration was subdued. This also minimized membrane compaction effects.

Compaction effects were determined from OSN membranes that were off-line for 1 hour after exposure to 5 bar of EtOH for 100 hours. The 1 hour "rest period" allowed the membranes to depressurize. EtOH permeances of PTMSP, PTMSP/PAF-1, and PTMSP/p-DCX membranes were 45%, 10% and 5% higher than membranes that were characterized immediately after 100 hours, respectively. Mobile PTMSP chains relaxed upon depressurization and regained some free volume content that contributed to the recovery of molecular transportation rates; hence accounting for the significant recovery of EtOH permeance in pure PTMSP membranes. It is important to highlight that the recovered PTMSP EtOH permeances through alcohol regeneration or decompaction remained lower than the initial EtOH permeance of as-cast PTMSP membranes; highlighting that the inefficiencies of such techniques. Evidently, the incorporation of PAF-1 and p-DCX nanoparticles removed the need for membrane revitalization techniques, as the EtOH permeances of these nanocomposite membranes remained comparable to their initial EtOH permeances throughout all experiments.

In the preceding, the unique interactions between porous additives such as p-DCX, and the super glassy polymer PTMSP has been utilised to enable longevity in high performing OSN membranes, reduce membrane compaction effects thus nullifying the need to stabilize membrane performance prior actual operation. This also ensures that the initial tantalising separation properties of the membranes are captured and immortalized. Addition of p-DCX reduced physical aging rates by 12%, whilst also doubling the permeance rates of EtOH through the fresh membrane. Careful experiments simulating applied settings delivered over 500 hours of continuous operation with stabilised performance, at as much as 90% higher permeance than aged controls. Detailed studies of various alcohols demonstrated the potential use of this system across a platform of low energy liquids purification applications. The permeabilites of our PTMSP/porous additive membranes stabilized to values that were higher than the initial permeances of as-cast PTMSP membranes, outperforming current state-of-the-art membrane. Unique threading of the polymer side chains into the additive pores was found to underpin this performance. Taken together, these findings enable further use of ageless, compaction-free OSN membranes as low energy separation alternatives, and further empower the highest performing polymers to be included in these membranes by imbuing them with longevity.

The invention claimed is:

1. A microporous polymeric composition comprising 60% to 90% by weight of a matrix polymer selected from at least one of substituted polyacetylenes and polymers of intrinsic microporosity (PIMs) and having a fractional free volume of at least 0.1 and dispersed particles comprising 5% to 25% by weight of the microporous polymeric composition of hypercrosslinked polymer comprising optionally substituted aryl groups (Ar) covalently linked by methylene bridging groups (CH$_2$) providing a link with repeating units —(Ar—CH$_2$—Ar—CH$_2$)n- wherein n is the number of repeating units.

2. A microporous polymeric composition according to claim 1, wherein the methylene bridging groups form covalent links between two adjacent aryl groups to form a six membered carbocyclic ring that is attached to the aryl rings.

3. A microporous polymeric composition according to claim 1, wherein the hypercrosslinked polymer is prepared by polymerization of a substituted aryl monomer comprising at least two chloromethylene groups by Friedel Crafts catalysed polymerisation.

4. A microporous polymeric composition according to claim 1, wherein the hypercrosslinked polymer is prepared by polymerization of an optionally substituted aryl monomer with an external crosslinker.

5. A microporous polymeric composition according to claim 4, wherein the hypercrosslinked polymer is formed by Friedel Crafts catalysed polymerisation.

6. A microporous polymeric composition according to claim 1, wherein the hypercrosslinked polymer is formed by post polymerisation crosslinking of polymers containing aryl monomers selected from optionally substituted vinylbenzyl chloride, vinylbenzyl chloride-co-divinylbenzene copolymers, vinylbenzylchloride copolymers having at least two reactive groups to provide a rigid covalent link between two aryl groups.

7. A microporous polymeric composition according to claim 1, wherein the hypercrosslinked polymer is formed by post polymerisation crosslinking using an external crosslinker of polymers containing aryl monomers.

8. A microporous polymeric composition according to claim 4, wherein the optionally substituted aryl groups comprise an aryl selected from the group consisting of carbocyclic aryl selected from the group consisting of benzene, biphenyl, naphthylene, tetrahydronaphthylene, idene, azulene, anthracene and heterocyclic aryl selected from the group consisting of furanyl, thiophenyl, 2Hpyrrolyl, pyrrolinyl, oxazolinyl, thiazolinyl, indolinyl, imidazolidinyl, imidazolinyl, pyrazolyl, pyrazolinyl, isoxazolidinyl, isothiazolinyl, oxadiazolinyl, triazolinyl, thiadiazolinyl, tetrazolinyl, pyridinyl, pyridazinyl, pyrimidinyl, pyrazinyl, triazenyl, indolyl, isoindolinyl, benzimidazolyl, benzoxazolyl, quinolinyl and isoquinolinyl and optional substituents are selected from the group consisting of C$_1$ to C$_4$ alkyl, C$_2$ to C$_4$ alkenyl, halo-C$_1$ to C$_4$ alkyl, amino, C$_1$ to C$_4$ alkylamino, di-(C$_1$ to C$_4$ alkyl)amino and sulfonate.

9. A microporous polymeric composition according to claim 1, wherein the repeating unit of the link comprises formula I or formula II:

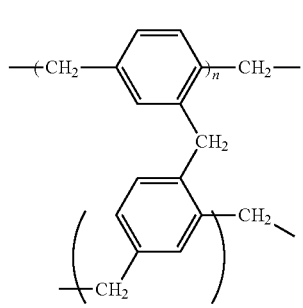

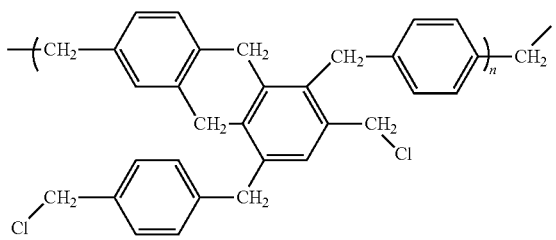

wherein n represent the number of repeating units.

10. A microporous polymeric composition according to claim 1, wherein the hypercrosslinked polymer has a Brunauer-Emmett-Teller (BET) surface area in the range of from 500 m2/g to 2500 m2/g.

11. A microporous polymeric composition according to claim 1, wherein the weight ratio of matrix polymer to hypercrosslinked polymer is at least 4:1.

12. A microporous polymeric composition according to claim 1, wherein the matrix polymer is soluble in chlorinated hydrocarbon.

13. A microporous polymeric composition according to claim 1, wherein the matrix polymer having a free volume of at least 0.1 is selected from substituted polyacetylenes.

14. A microporous polymeric composition according to claim 1, wherein the matrix polymer is a substituted polyacetylene polymer comprising at least one selected from the group consisting of poly(1-(trimethylsilyl)-1-propyne) (PTMSP), poly(1-(dimethyl-n-propylsilyl)-1-propyne), poly(1-(dimethyl-n-butylsilyl)-1propyne), poly(1-phenyl-1-propyne)poly (diphenylacetylene), poly (t-butylacetylene), poly (1-phenyl-2-p-trimethylsilylphenyl-acetylene), poly(1-phenyl-2-p-hydroxyphenylacetylene), poly(4-methyl-2pentyne) and copolymers of two or more thereof.

15. A microporous polymeric composition according to claim 14, wherein the substituted polyacetylene polymer is poly-1-(trimethylsilyl)-1propyne.

16. A microporous polymeric composition according to claim 1, in the form of a membrane.

17. A microporous polymeric composition according to claim 16, for use in gas separations, liquid separations or separation of solids from liquids.

18. A microporous polymeric composition according to claim 16, wherein the gas permeability of the membrane is more than 80% after 100 days.

19. A microporous polymeric composition according to claim 16, wherein the gas permeability of the membrane does not decrease by more than 10% over a period of 50 days.

20. A method of preparing microporous polymeric composition according to claim 1 comprising the steps of:
(a) dissolving a matrix polymer in a liquid to form a polymer solution,
(b) introducing porous particles of the hypercrosslinked polymer to the polymer solution, and
(c) subsequently removing at least a portion of the liquid to thereby form the microporous material.

21. A method of performing size-selective separation of a component in a mixture selected from a mixture of fluids or a mixture of a solid and a fluid, the method comprising the steps of:
providing the mixture comprising a fluid component;
contacting the mixture with one surface of a membrane comprising a microporous polymeric composition according to claim 1;
applying a pressure difference across the membrane; and
isolating a filtered composition from the opposite surface of the membrane to provide a filtered composition enriched in one component of the mixture.

22. A method for separation of liquids by pervaporation comprising the steps of:
(a) providing a membrane having a feed side and a permeate side, the membrane comprising a separating layer of a microporous polymeric composition according to claim 1;
(b) passing a liquid mixture containing a component to be separated across the feed side;
(c) providing a driving force for transmembrane permeation; and
(d) withdrawing from the permeate side a mixture comprising a gas or vapour enriched in the component compared with the liquid mixture.

23. A method of separation according to claim 22 wherein the mixture of liquids is an aqueous alcohol mixture and the alcohol is enriched on the permeate side.

24. A microporous polymeric composition comprising a matrix polymer having a fractional free volume of at least 0.1 and dispersed particles comprising hypercrosslinked polymer comprising optionally substituted aryl groups covalently linked by methylene bridging groups ($CH_2$) wherein the hypercrosslinked copolymer is obtained by a friedel crafts catalysed polymerisation of either:
(a) a substituted aryl monomer comprising at least two chloromethylene groups; or
(b) an optionally substituted aryl monomer with an external cross-linker.

* * * * *